(12) United States Patent
Meyer, Jr. et al.

(10) Patent No.: US 7,842,403 B2
(45) Date of Patent: Nov. 30, 2010

(54) ANTIFRICTION COATINGS, METHODS OF PRODUCING SUCH COATINGS AND ARTICLES INCLUDING SUCH COATINGS

(75) Inventors: William H. Meyer, Jr., Rock Hill, SC (US); Craig V. Bishop, Fort Mill, SC (US); William Bradford Staples, Monroe, NC (US)

(73) Assignee: Atotech Deutschland GmbH, Berlin (DE)

( * ) Notice: Subject to any disclaimer, the term of this patent is extended or adjusted under 35 U.S.C. 154(b) by 1317 days.

(21) Appl. No.: 11/360,967

(22) Filed: Feb. 23, 2006

(65) Prior Publication Data

US 2007/0196632 A1 Aug. 23, 2007

(51) Int. Cl.
B32B 7/02 (2006.01)
(52) U.S. Cl. ............... 428/686; 428/673; 428/467; 428/469; 428/472; 411/548; 411/914
(58) Field of Classification Search ................ None
See application file for complete search history.

(56) References Cited

U.S. PATENT DOCUMENTS

| | | | |
|---|---|---|---|
| 3,634,129 A | 1/1972 | Benz | 117/119.6 |
| 4,114,505 A | 9/1978 | Loeser et al. | 85/1 |
| 4,256,811 A | 3/1981 | Black | 428/562 |
| 4,868,066 A | 9/1989 | Whitmore | 428/551 |
| 4,964,774 A * | 10/1990 | Lat et al. | 411/446 |
| 4,997,686 A | 3/1991 | Feldstein et al. | 427/443 |
| 5,145,517 A | 9/1992 | Feldstein et al. | 106/1.05 |
| 5,300,330 A | 4/1994 | Feldstein et al. | 427/443.1 |
| 5,575,865 A | 11/1996 | Isenberg et al. | 148/265 |
| 5,707,725 A * | 1/1998 | Feldstein et al. | 428/325 |
| 5,730,568 A | 3/1998 | Lanham et al. | 411/432 |
| 5,863,616 A | 1/1999 | Feldstein et al. | 427/443.1 |
| 6,273,943 B1 | 8/2001 | Chiba et al. | 106/1.22 |
| 6,318,898 B1 | 11/2001 | Ward et al. | 384/492 |
| 6,579,592 B1 * | 6/2003 | Matsubaguchi et al. | 428/141 |
| 6,734,147 B2 | 5/2004 | Levy | 508/103 |
| 6,837,923 B2 | 1/2005 | Crotty et al. | 106/1.22 |

(Continued)

FOREIGN PATENT DOCUMENTS

EP 0059273 A1 9/1982

(Continued)

OTHER PUBLICATIONS

Modern Tribology Handbook vol. 2, 2001, CRC Press LLC Chapter 22.*

(Continued)

Primary Examiner—Jennifer C McNeil
Assistant Examiner—Adam C Krupicka
(74) Attorney, Agent, or Firm—Renner, Otto, Boisselle & Sklar, LLP

(57) ABSTRACT

A coated substrate and a process for forming the coated substrate, including a first lubricious coating layer overlying the substrate, the first lubricious coating layer including a first lubricant providing to the first lubricious coating layer a first coefficient of friction; and a second lubricious coating layer overlying the first lubricious coating layer, the second lubricious coating layer including a second lubricant providing to the second lubricious coating layer a second coefficient of friction, in which the second coefficient of friction is greater than the first coefficient of friction.

26 Claims, 4 Drawing Sheets

Exemplary Processes for Applying Lubricious Coating to a Substrate

U.S. PATENT DOCUMENTS

| | | | | |
|---|---|---|---|---|
| 6,893,687 | B2 | 5/2005 | Maurus | 427/508 |
| 6,936,340 | B2* | 8/2005 | Jakusch et al. | 428/220 |
| 2007/0196632 | A1* | 8/2007 | Meyer et al. | 428/212 |

FOREIGN PATENT DOCUMENTS

| | | |
|---|---|---|
| GB | 1500594 A | 2/1978 |
| GB | 2097812 A | 11/1982 |
| GB | 2232672 A | 12/1990 |
| JP | 56-118394 | 9/1981 |
| WO | 98/46687 | 10/1998 |

OTHER PUBLICATIONS

International Search Report and Written Opinion of the International Searching Authority, Application No. PCT/US2007/003730, mailed Oct. 25, 2007.

Fuchs Lubritech (UK) LTD. Product Brochure, White Pastes and Grease Pastes, Composition, Properties and Application Examples. Date unknown.

Nakajima et al.; "Inorganic Dry Film Lubricant Coated Galvannealed Steel Sheet with Excellent Press Formability and Adhesive Compatibility"; *Kawasaki Steel Technical Report*, No. 48, Mar. 2003.

Batista et al.; "Bifurcations from steady sliding to stick slip in boundary lubrication"; *Physical Review E, The American Physical Society*; vol. 57, No. 5, May 1998.

Fedlstein; "Surpassing Chrome Plating with Composite Electroless Nickel Coatings"; Presented at Conference on Chrome and Cadmium Alternatives, Oct. 2000.

Feldstein; "Composite Electroless Nickel Coatings for the Gear Industry"; *Gear Technology, The Journal of Gear Manufacturing*; 1997.

NiSLIP™ Product Information; www.surfacetechnology.com/specs-500.htm. Date unknown.

Iler; "The Chemistry of Silica"; John Wiley & Sons, 1999.

Gardner et al.; "High Performance Alternative to Hexavalent Chromium Passivation of Plated Zinc and Zinc Alloys"; *Society of Automotive Engineers, Inc.*; 2001.

Dupont et al.; "Friction Modeling and Control in Boundary Lubrication"; Proceedings of the 1993 American Control Conference, San Francisco, CA, Jun. 1993, pp. 1910-1914.

Rabinowicz; "Friction—Especially Low Friction"; Conference on Fundamentals of Tribology, 1978.

Nassar et al.; "Bearing Friction Torque in Bolted Joints"; Fastening and Joining Research Institute, Mechanical Engineering Department; 2004.

ASM Handbook ®; vol. 18, Friction, Lubrication, and Wear Technology. Date unknown.

Laminated Wood-Based Composites to Mass Transfer; Encyclopedia of Chemical Technology, Third Edition, 1984, vol. 14, pp. 476-527.

Modern Tribology Handbook, vol. One, Principles of Tribology, 2001, pp. 361-363 and 459-463.

Modern Tribology Handbook, vol. Two, Materials, Coatings, and Industrial Applications, 2001, pp. 787-825.

Tervoort et al.; "On Abrasive Wear of Polyethylene"; *Macromolecules*, 2002, 35, 8467-8471.

Friedrich; "Recent Trends in Polymer Composite Materials for Tribology Applications—From Macro—to nano-Scale"; *Chem. Listy. Symposia*, 96, S3-S16, 2002.

Erdemir et al.; "Relation of Certain Quantum Chemical Parameters to Lubrication Behavior of Solid Oxides"; *International Journal of Molecular Sciences*, 2005, 6, 203-218.

Wahl et al.; "Low Friction, High Endurance Ion-Beam Deposited Pb-Mo-S Coatings"; *Surface and Coatings Technology*, 73, 1995, 152-159.

Wynn; "Electrocoating for Fasteners"; *Trans. Inst. Met. Finish* (2001), 79(6), B100-102.

Wynn; "Topcoats"; *Product Finishing* (2001), 7, p. 5.

Wynn; "Fastener Coating Developments"; *Fastener & Fixing Europe* (2003) 3.

Wynn; "ELVD & IMDS: Their Implications for Fasteners"; *F & F Magazine* (2002) 203.

Wynn: "ELVD & IMDS: Their Implications for Surface Finishing" *Trans. Inst. Met. Finish.* (2002), 80(9), B80-83.

Wynn; "Replacing Hexavalent Chromium in Passivations on Zinc Plated Parts"; *Products Finishing* (2001), 65(5), 55-62.

* cited by examiner

ANTIFRICTION COATINGS, METHODS OF PRODUCING SUCH COATINGS AND ARTICLES INCLUDING SUCH COATINGS

TECHNICAL FIELD

The present invention relates generally to lubricious coatings for articles, and more specifically to lubricious coatings for articles such as fasteners, parts for automobiles and the like, to methods of producing such coatings and to the articles having such coatings applied thereto.

BACKGROUND

Coating materials to protect and improve the surface qualities of articles such as plastic or metallic (i.e., solid) fasteners and other assembly articles have become widespread and widely accepted, particularly in the automotive industry where stringent requirements generally exist. Among the requirements are a surface that exhibits a low but consistent coefficient of friction, that includes a coating which strongly adheres to the substrate and that includes additives for purposes such as corrosion protection and coloration. Numerous coatings and treatments have been developed and used for such purposes, and many of these remain important. However, especially in the automotive industry, performance requirements for such articles have become increasingly stringent. Some materials, such as hexavalent chromium, are no longer acceptable or are being phased out. As the performance, environmental, health, safety and disposal (end of life) requirements become more stringent, the point has come where existing compositions are unable to meet all of the requirements. The prevention of corrosion has also become a major concern, particularly in the automotive industry. At the same time as requirements such as these are becoming more stringent, the articles are still required to meet the same usefulness standards as have historically been required such as, for example, providing a consistent coefficient of friction so that torque requirements can be consistently measured and met, thus allowing a precise determination of the actual lubricant content.

Coating articles such as a bolt with a corrosion resistant coating has obvious importance. Steel bolts are common but are not effective if severely corroded. Coating methods include phosphatizing, phosphatizing followed by painting or oil immersion, plating (e.g. electroplating, electroless plating, mechanical plating, or galvanizing) and plating followed by painting. For fasteners with tight dimensional tolerances electroplating or electroless plating is often a preferred method of preventing corrosion. In particular, zinc or zinc alloy electroplating, in which the zinc corrodes preferentially and is sacrificial to steel corrosion, is a cost effective corrosion protection method. However, zinc plating has generally been accompanied by formation of a conversion coating by, e.g., chromating (forming a film from hexavalent chromium), or passivation (forming a film from trivalent or non-chromium solutions). Recently, it has become common practice to treat conversion coated, electroplated zinc fasteners with a seal to extend corrosion protection. Seals are generally based upon siccative and/or curable solutions that include inorganic films such as silicates, or mixtures of silicates with silica, or organic films, such as acrylates, urethanes, or mixtures of acrylates and urethanes; or mixtures of inorganic and organic materials.

The tightening of a bolt or a nut to produce a clamping load, or the insertion of a rivet into a hole is an important component of assembly of a multitude of mechanical assemblies, such as automobiles. The reliability, safety and quality of bolted assemblies are affected by the level and stability of fastener tension. Turning the head of a threaded fastener, or turning the nut onto a threaded fastener achieves fastener tension. It is commonly accepted that overall tightening torque is a combination of 1) the friction of the threads; 2) the tightening force imparted to the bolt; and 3) the friction between the contact surface of the assembly, the bearing surface, and the underhead of a bolt and/or between the bearing surface of the assembly and the underhead of the nut.

Today many assembly steps are carried out by robots. The robots may be programmed to determine when a part, a bolt for example, is sufficiently tightened, based primarily on the torque measured by sensors. If lubrication applied to a bolt is too little (or if the coefficient of friction is too great), then the robot may not fully tighten the bolt, because the sensed torque will meet the pre-programmed torque limit as a result of the excess friction, not because the bolt is actually fully tightened. Conversely, if lubrication applied to a bolt is excessive (and the coefficient of friction is too low), then the robot may over-tighten the bolt and damage the assembly, for example, by snapping off the head of the bolt or stripping out the threads, because the sensed torque will not meet the pre-programmed torque limit as a result of the too-low friction. Thus, attaining adequate but not excessive lubrication is a problem constantly facing those involved in assembly operations. Because the robotic systems include sensors to determine torque, these sensors and the electronic controls are programmed to use various equations known in the art to correlate torque with friction and thereby with tightening determinations. These systems must necessarily make assumptions about the flatness (or smoothness) of surfaces, about the coefficient of friction, about the clamping load applied to a bolt or other part, about wear rates for lubricants, conversion coatings and substrates, and about other variables. All of these assumptions are used to address the problem of determining when a fastener has been sufficiently tightened, for example, and the assumptions rely on consistent, relatively uniform parts having consistent characteristics.

Because friction is an important part of the process of tightening a fastener, e.g., a threaded bolt and nut combination, the control of friction by lubrication of the contacting surfaces is important. Lubrication sufficiency may be determined by measurement of the friction, or coefficient of friction, resulting from use of the lubricant applied between surfaces moving with respect to each other. Lubrication regimes may be defined by a Stribeck curve where coefficient of friction is plotted as a function of sliding speed for a combination of two surfaces, referred to as a tribological pair, and an intervening lubricant. Boundary lubrication is the situation if the sliding speed is low and the loading force is totally carried by asperities in the contact area, protected by adsorbed molecules of the lubricant and/or a thin lubrication and/or oxide layer. The interactions of boundary lubricated surfaces and the relationship of shear strengths of lubricants and surface asperities to overall lubricity are known to relate to wear of the lubricant and to play a role in boundary lubrication.

Boundary lubrication situations exist with machine bearings when they are being started or stopped and the velocity is not high enough to create a hydrodynamic regime. Other examples include contact between gear teeth, turbine wicket gates and other slow moving equipment such as hydraulic reciprocation in lifting operations or with shock absorbers or with struts used, for example, to control opening and closing of automobile hood or trunk lids. In boundary lubrication, atomically flat surfaces are separated by a few molecular layers of lubricant, and the behavior of the interface becomes qualitatively different from the more familiar case of bulk viscosity which is traditionally associated with lubricants. Boundary lubrication may be important where surfaces are not atomically flat, particularly at the sites of any asperity or where slightly differing geometries result in the closer approach of relatively moving parts in certain areas or regions.

Stick-slip lubrication situations exist with parts moving with respect to each other when separated by a lubricant in which the parts move in a "stop-start" cycle. Lubricant additives may be included to avoid or reduce this phenomenon.

To help control the torque during tightening, the fasteners that have been prepared by, e.g., zinc plating, conversion coating, and possibly sealing may be treated with a lubricating solution such as diluted FUCHS LUBRITECH® Gleitmo 605 or diluted Valsoft PE-45 from Spartan Adhesives and Coatings Co. Such lubrication coatings are often called dry film lubricants. The lubricant may also be combined with a seal layer, in which the resulting coating may be referred to as an integral lubricant seal. In these lubrication processes, the lubricant is uniformly distributed in the single lubricious coating.

Some typical prior art treated metal parts are schematically illustrated in FIGS. 1-4. FIG. 1 schematically depicts a prior art metal article 100 including a metallic substrate 10, a zinc or zinc alloy layer 12, an anticorrosion layer 14 and a lubricant coating 16. The substrate 10 may be any suitable metal article, such as a fastener, e.g., a bolt, nut, screw, etc., which may be made of steel, for example. In such prior art embodiments, the zinc or zinc alloy (e.g., zinc-iron, zinc-cobalt, zinc-nickel) layer 12 may be, for example, a hot-dip galvanized or electroplated layer applied to the substrate 10. In some prior art embodiments, the anticorrosion layer 14 would be a hexavalent chromium conversion coating, applied directly to the zinc or zinc alloy layer 12. The lubricant layer 16 may contain any known lubricant for such uses. A seal layer (not shown) may be formed over the lubricant, or the lubricant may be an integral part of the seal layer, in which case the lubricant layer 16 would be a seal/lubricant layer. In this example, the lubricant is uniformly distributed in the single lubricious coating.

FIG. 2 schematically depicts a prior art metal article 200 including a metallic substrate 10, a zinc or zinc alloy layer 12, an anticorrosion layer 14, a seal layer 18 and a lubricant coating 16. The substrate 10 may be any suitable metal article, such as a fastener, e.g., a bolt, nut, screw, etc., which may be made of steel, for example. In such prior art embodiments, the zinc or zinc alloy (e.g., zinc-iron, zinc-cobalt, zinc-nickel) layer 12 may be, for example, a hot-dip galvanized or electroplated layer applied to the substrate 10. The anticorrosion layer 14 again may be a hexavalent chromium conversion coating, applied to the zinc layer 12. A seal layer 18 is applied over or onto the anticorrosion layer 14. The lubricant coating 16 may contain any known lubricant for such uses. In this example, the lubricant is uniformly distributed in the single lubricious coating.

FIG. 3 schematically depicts a prior art metal article 300 including a metallic substrate 10, a zinc or zinc alloy layer 12, an anticorrosion layer 20, a seal layer 18 and a lubricant coating 16. The substrate 10 may be any suitable metal article, such as a fastener, e.g., a bolt, nut, screw, etc., which may be made of steel, for example. In such prior art embodiments, the zinc or zinc alloy layer 12 may be, for example, a hot-dip galvanized or electroplated layer applied to the substrate 10. The anticorrosion layer 20 in this prior art example may be a passivation material free of hexavalent chromium, applied to the zinc layer 16. The passivation material free of hexavalent chromium may include, for example, trivalent chromium, an electroless nickel, or an electroplated nickel-phosphorus (NiP) alloy, deposited on the zinc layer 12. The seal layer 18 is applied over or onto the anticorrosion layer 20. The lubricant layer 16 may contain any known lubricant for such uses. As with the examples of FIGS. 1 and 2, the seal layer 18 may be applied over the lubricant layer 16. In this example, the lubricant is uniformly distributed in the single lubricious coating.

FIG. 4 schematically depicts a prior art metal article 400 including a metallic substrate 10, a zinc or zinc alloy layer 12, an anticorrosion layer 14 and an integral seal layer 22. The substrate 10 may be any suitable metal article, such as a fastener, e.g., a bolt, nut, screw, etc., which may be made of steel, for example. In such prior art embodiments, the zinc or zinc alloy layer 12 may be, for example, a hot-dip galvanized or electroplated layer applied to the substrate 10. The anticorrosion layer 14 applied to the zinc layer 16 in this prior art example may be the hexavalent chromium layer 14 shown, or it may be a passivation material free of hexavalent chromium, such as the anticorrosion layer 20 shown in FIG. 3, or any other suitable passivation or anticorrosion material. The passivation material free of hexavalent chromium may include, for example, trivalent chromium, an electroless nickel, or an electroplated nickel-phosphorus (NiP) alloy, deposited on the zinc layer 12. In this alternative, there is an integral seal layer 20 in which the lubricant is an integral part of a seal layer. In this example, the lubricant is uniformly distributed in the single lubricious coating.

In all of the foregoing prior art examples (e.g., as described with respect to FIGS. 1-4), and in the prior art generally, the lubricant layer or integral seal layer is a uniform lubricious layer in which the lubricant is evenly and uniformly distributed. Such lubricants are generally dry to the touch antifriction coatings, and these include and are sometimes referred to as dry film lubricant, organic lacquer lubricant or an integral lubricant. The dry film lubricant is dry after application and heating and the resulting lubrication layer is essentially only lubricant, so by definition is uniformly distributed. The organic lacquer lubricant may contain an organic binder and a solid lubricant. The organic binder may be, e.g., wax with resins, and the solid lubricant. The integral lubricant coating is a mixture of lubricant with other materials, such as aesthetic (e.g., color) or corrosion resistant or combinations, in which particles of the lubricant are uniformly distributed. In both the organic lacquer lubricant and the integral lubricant, the lubricant material may be, e.g., particles of a polymer such as polyethylene, PTFE, graphite or another material such as molybdenum sulfide ($MoS_2$), for example. When any additional lubricant is used, it is generally the most lubricious and it is applied to the outermost surface of the part.

In all of the foregoing examples, and in the prior art generally, the problem of providing adequate but not excessive lubrication for a wide variety of parts having various geometries and surface qualities and features, has persisted. Although many lubricants are known and widely used, a need remains for improved lubricants, particularly for parts such as fasteners that are subjected to large pressure, torque and frictional forces and where such forces are frequently applied by robots.

While applying a lubricant to the exterior of an object produces the advantage of reducing friction it is very difficult to achieve uniformity of friction with the single uniform layer of lubricant unless the coating containing the lubricant is thick enough to not be worn through during the period when lubrication is necessary. However, thick coatings are not useful for threaded fasteners, as they will affect the dimensions of the male and female threads. As with other objects, thick coatings may also deleteriously affect dimensional tolerances. With thin lubricious coatings containing uniform lubricant, the surfaces of the sliding objects are very close and the lubricating media is very thin, and this combination means that small imperfections in the surface, asperities, and/or uneven distribution of pressure over the surface due to geometric differences, will produce variations in wear such that some regions will have sufficient lubricant, while in other regions the lubricant layer will be worn through or broached. When such wear or broach occurs, the apparent overall coefficient of friction changes for the sliding surfaces, resulting in problems associated with the change in friction, and where the lubricant layer has been completely worn away, the underlying layers may also be damaged, resulting in possibly deleterious effects, for example, an increased possibility of corrosion, during the lifetime of the substrate.

For all these reasons, problems remain and improvements in lubricious coatings, particularly for mass produced but critically important parts such as fasteners, are very much needed.

SUMMARY

In the present invention, a coating system is provided that compensates for variations in sliding speed and pressure by coating parts with a lubricious coating in which the coefficient of friction of the outermost surface portion of the lubricious coating is greater than the coefficient of friction of the inner portions of the lubricious coating. The present invention provides a dry-to-the-touch lubricious coating in which the lubricant in the coating is present at a higher concentration at the coating interface with the underlying layer or substrate than at the outer surface of the coating. In general, the lubricious coating will contain at least one other material, which may be, for example, a corrosion inhibitor, or a seal material. In this way, where surfaces are uneven or not smooth, the coating of the present invention provides some compensation so that, for example in tightening a threaded fastener, there are reduced changes and more uniformity in the torque observed during the tightening process.

The difference in coefficient of friction between the outer portions and the inner portions can be obtained in either or both of two basic ways. In one embodiment, the same lubricant is used, but in different amounts, to obtain the difference in coefficient of friction. In another embodiment, different lubricants may be used to impart the difference in coefficient of friction. In the latter embodiment, the two different lubricants may be used in any relative amount, as long as the coefficient of friction of the outer portion remains greater than the coefficient of friction of the inner portion. Thus, where certain localized regions of the surfaces are subjected to higher wear, e.g., higher sliding distances, high pressure regions, or uneven or less-smooth regions, the initial, higher coefficient of friction surface will be worn away and a more slippery surface, i.e., a surface having higher lubricity and a lower coefficient of friction, is created or revealed. This continues until the lubricity of the localized regions is again equilibrated or been adjusted and in which the undesired effects of variations, such as asperities, have been mitigated, to obtain a more uniform wear or more uniform drag or torque tension. This contrasts to the conventional means of controlling the friction of surfaces such as in threaded fasteners where the outer surface of the entire article has a single uniform lubricant as a torque tension modification material.

The lubricious coating may be produced by a process including immersing a substrate in a first composition containing a corrosion resistant material and a lubricant at a first concentration, immersing the thus-coated substrate in a second composition containing the lubricant at a second concentration, in which the second concentration is lower than the first concentration. These steps may be repeated, and a third step may include immersing the substrate with the first two lubricant layers already formed in a third composition containing a lubricant at a third concentration, where the third concentration is lower than the second concentration. The second and any subsequent compositions may include a corrosion resistant material or other materials, such as a seal formed by a resin or binder.

Thus, in one embodiment, the present invention provides a coated substrate, including a first lubricious coating layer overlying the substrate, the first lubricious coating layer comprising a first lubricant providing to the first lubricious coating layer a first coefficient of friction; and a second lubricious coating layer overlying the first lubricious coating layer, the second lubricious coating layer comprising a second lubricant providing to the second lubricious coating layer a second coefficient of friction, wherein the second coefficient of friction is greater than the first coefficient of friction.

In another embodiment, the present invention provides a dry to the touch coating on a substrate, wherein the coating comprises an outer surface and an inner surface overlying the substrate, at least one lubricant and at least one non-lubricious material, wherein the at least one lubricant provides a higher coefficient of friction at the outer surface than at the inner surface.

In another embodiment, the present invention provides an article, including a substrate; a layer (a) of zinc or zinc alloy on at least a portion of the substrate; a layer (b) of trivalent chromium conversion coating overlying the layer (a); a first lubricant-containing layer (c) overlying the layer (b); and a second lubricant-containing layer (d) overlying the layer (c), in which the layer (c) provides a coefficient of friction lower than a coefficient of friction of the layer (d).

In another embodiment, the present invention provides an article, including a substrate; a layer (a) of zinc or zinc alloy on at least a portion of the substrate; a layer (b) of trivalent chromium conversion coating overlying the layer (a); and a lubricant-containing layer (c) overlying the layer (b), in which the layer (c) comprises an inner surface contacting or overlying the layer (b) and an outer surface facing away from the layer (b) and a lubricant, in which the lubricant imparts lower coefficient of friction at the inner surface than at the outer surface. That is, in this embodiment, the lubricious composite coating layer (c) has a gradient of decreasing lubricant and increasing coefficient of friction, moving outward from the surface of the substrate to the outer surface of the lubricious coating layer.

In another embodiment, the present invention provides a process for applying a lubricious coating to a substrate, including applying a first lubricious coating layer over the substrate, the first lubricious coating layer containing a first lubricant providing to the first lubricious coating layer a first coefficient of friction; and applying a second lubricious coating layer over the first lubricious coating layer, the second lubricious coating layer containing a second lubricant providing to the second lubricious coating layer a second coefficient of friction, in which the second coefficient of friction is greater than the first coefficient of friction.

In another embodiment, the present invention provides a process for applying a lubricious coating to a substrate, including immersing a substrate in a first composition comprising a first lubricant; removing the substrate from the first composition, to form a first lubricious coating layer comprising the first lubricant over the substrate; immersing the substrate with the first lubricious coating layer thereon into a second composition comprising a second lubricant to form a second lubricious coating layer comprising the second lubricant over the first lubricious coating layer, in which the first lubricious coating layer provides a first coefficient of friction and the second lubricious coating layer provides a second coefficient of friction, and in which the first coefficient of friction is lower than the second coefficient of friction.

In another embodiment, the present invention provides a process for applying a lubricious coating to a substrate, including immersing a substrate in a first composition comprising a first lubricant; removing the substrate from the first composition, to form a first lubricious coating layer comprising the first lubricant over the substrate; applying a second lubricious coating layer comprising a second lubricant over the first lubricious coating layer, in which the first lubricious coating layer exhibits a first lubricity and the second lubricant exhibits a second lubricity and the first lubricity is greater than the second lubricity.

The process may include use of a passivant or anti-corrosive in the first composition and when the substrate is removed from the first composition, a base layer including a conversion coating is formed by the passivant or anti-corrosive on the substrate and the first lubricious coating layer is formed on the base layer.

The first lubricant may be emulsified or otherwise dispersed in the first composition, and when the substrate is removed from the composition, the lubricant separates from the emulsion and forms a substantially uniform layer of lubricant on the conversion coating.

The process may further include applying one or more metal or alloy on the substrate, and the base layer of a conversion coating is formed by a passivant or anti-corrosive composition on the metal or alloy and the first lubricious coating layer overlies the base layer.

The process may further include, following the step of applying the second lubricious coating layer, heating the coated substrate to cause diffusion between the first lubricious coating layer and the second lubricious coating layer, so that a composite coating layer may be formed wherein the composite coating layer comprises a higher lubricant concentration adjacent the base layer than on outer portions of the composite coating layer. This can form a coating in which the lubricant concentration is in a gradient in the composite coating layer, gradually decreasing in concentration from adjacent the base layer towards an outer surface of the gradient layer, thus having an increasing coefficient of friction from the inner to the outer portions of the layer.

The present invention provides a solution to the problems of providing improved articles with lubricating properties that result in more uniform torque tension tests and more uniform lubricious surfaces. The invention provides a solution to the problem of differential wear of lubricating layers and of the underlying substrates due to non-uniform surfaces, shapes and geometries of the substrates.

Figure 1:
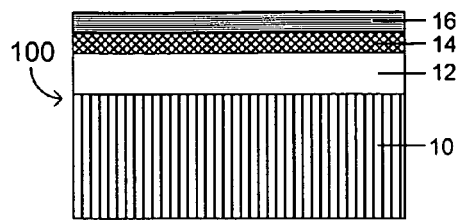
FIGS. 1-4 are cross-sectional schematic views of conventional metal treatments and lubricating layer applied to the surface of a metallic substrate.
Figure 2:
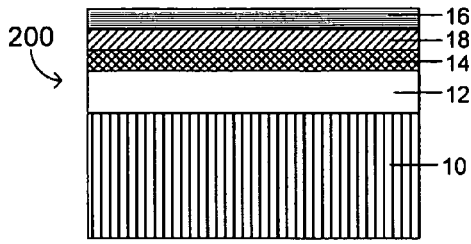
Figure 3:
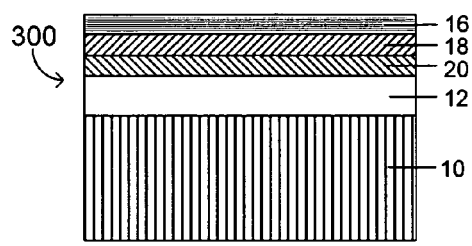
Figure 4:
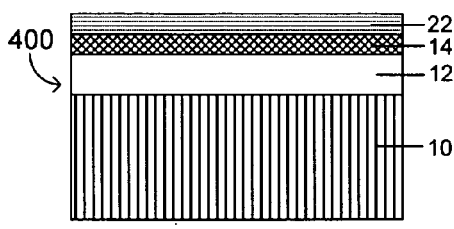

It should be appreciated that for simplicity and clarity of illustration, elements shown in the Figures have not necessarily been drawn to scale. For example, the dimensions of some of the elements may be exaggerated relative to each other for clarity. Further, where appropriate, reference numerals have been repeated among the Figures to indicate corresponding elements.

Furthermore, it should be appreciated that the process steps and structures described below do not form a complete process flow for manufacturing parts such as fasteners. The present invention can be practiced in conjunction with fabrication techniques currently used in the art, and only so much of the commonly practiced process steps are included as are necessary for an understanding of the present invention.

DETAILED DESCRIPTION

As used herein, a lubricant is any substance interposed between two surfaces in relative motion for the purpose of reducing the friction and/or the wear between them.

As used herein, lubricity is a measure of and refers to the degree of lubrication provided by a given amount of a given lubricant, that is, the ability of a lubricating material to lubricate or to reduce the coefficient of friction (COF) of the tribological pair; this is also sometimes referred to as film strength. A given quantity of a first material having a relatively high lubricity will provide greater or longer-lasting lubrication than will the same quantity of a second material having a relatively lower lubricity.

As used herein a siccative material is one which contains substances that dry quickly, such as when solvent is removed by evaporation, application of heat or when a drying reaction takes place under the influence of oxygen or another energy source such as x-ray, ultraviolet light, electron beams, etc., or electrical energy applied in an electrophoretic process, to form a solid material.

As used herein, a dry film lubricant is a lubricant applied to a part, usually from a dispersion or emulsion, which, when dried, e.g., by application of heat, becomes dry to the touch.

As used herein, an organic lacquer lubricant is a coating containing a lubricant in a curable and/or siccative matrix that, e.g., by application of heat, becomes dry to the touch. The matrix may be a dispersion, solution or emulsion.

As used herein, an integral lubricant is a dry to the touch coating containing a lubricant and a binder or a cured or dried (e.g., siccative) material. The initial matrix is usually a mixture of dissolved, dispersed and/or emulsified lubricant with a curable or siccative material.

As used herein, a conversion coating is a coating produced on a metal surface by reaction of the metal's external or surface atomic layers with anions of a suitably selected medium, in a general reaction written as:

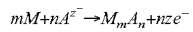

$$mM + nA^z \rightarrow M_m A_n + nze^-$$

in which M=metal reacting with the medium, and
A=medium anion having an initial charge z.

As is known in the art, the formation of a given conversion coating may be more complex than the foregoing general reaction scheme. Conversion coatings include, for example, chromating with hexavalent chromium, passivating with trivalent chromium or other passivants, phosphating, oxalating, phosphating with other metal ions such as Zn or Mn (to form, e.g., a conversion coating containing chemically metallizing layer including, e.g., zinc phosphate ($Zn_3(PO_4)_2 \cdot xH_2O$)), and anodizing. A conversion coating may be applied, for example, by immersing the treated article in a reactive solution, spraying the solution onto the surface to be treated, and covering the surface with a concentrated reactive solution. Conversion coatings can be produced on the surface of almost all metals. Conversion coatings are generally known in the art and need not be discussed in detail here.

Throughout the disclosure and claims, the numerical limits of any ranges and ratios disclosed herein may be combined, and integral intervening values are deemed to be disclosed as well as the endpoint limits specifically mentioned.

In the present invention the outermost surface of the coatings on a substrate does not have the highest lubricity region. Rather, the outer coating region has less lubricity than does at least one underlying layer or region of the coating. As a result, unlike tightening a bolt using conventional technologies where the outermost surface, if worn, transforms into a surface with higher friction, the lubricious coating in accordance with the present invention produces regions of lower friction when the outer surface of the coating is worn away. This is advantageous when some regions of the substrate, e.g., a threaded fastener, are subjected to wear rates that otherwise could wear through the lubricious coating. By providing an intervening, more lubricous layer, such wear may not reach the surface of the substrate and result in a large increase in friction from the lack of any further lubricious layer between the tribological pair.

In accordance with the present invention, surfacial areas that were initially wearing at high rates become more lubricous as they are worn, and thereby can possibly achieve, or at least approach, the same wear rate as other areas on the surface. This capability provides the fastener with improved ease of use and reduced risk of eventual failure due to loss of protective coatings on the surface, such as anticorrosion coatings. This capability also provides a more uniform and consistent torque regime, facilitating automated application of fasteners, improved bearing life, and improved strut formation, for example.

As will be understood, on the surface of the threads of a threaded fastener, each of the velocity of movement, the amount of force applied and the degree of wear that occurs, can vary by location. Thus, the degree of wear of the coating on the threaded fastener, due to a combination of these factors will vary. In accordance with the present invention, by providing a differential lubricity with depth of the coating, different areas on the fastener can be provided with a more uniform wear rate. Surfaces that move at higher speeds, and/or over greater distances, and/or that are subjected to greater normal force, and thereby are subjected to greater wear, are provided with more lubricity and thus distribute the frictional load over a wider area. Such a coating may be said to exhibit inverted lubrication properties. That is, the coating becomes more slippery as it wears, resulting in lower wear rates as wear proceeds approaching the point where the coating is completely worn away.

In accordance with one embodiment of the present invention, there is provided a coated substrate, including at least a first lubricious coating layer overlying the substrate and a second lubricious coating layer overlying the first lubricious coating layer. The first lubricious coating layer includes a first concentration of a lubricant; and the second lubricious coating layer includes a second concentration of the lubricant which is reduced relative to the first concentration of the lubricant. Thus, the layer closer to the substrate, i.e., the inner layer of the two coating layers, contains more lubricant than does the second, outer coating layer. Additional lubricious coating layers may be added, such as a third lubricious coating layer overlying the second lubricious coating layer, in which the third lubricious coating layer includes a concentration of the lubricant that is reduced relative to the second concentration of the lubricant and relative to the first concentration of the lubricant. Of course, additional layers may be added; thus, at least two additional coating layers may be provided overlying the second lubricious coating layer, in which each successive coating layer includes a reduced concentration of lubricant relative to each preceding coating layer. That is, each successive coating layer of lubricant contains less lubricant than the coating layer on which it is applied. It should be understood that the net effect of the foregoing concentrations of lubricant in the respective layers is that the outer layer(s) should have a higher coefficient of friction than do the inner layers.

Thus, the relationship between the layers can be described or measured in terms of the resulting coefficient of friction, rather than in terms of the concentration of lubricant in the respective coating layers. This description is useful when different lubricating materials are used in the respective layers. Thus, in another aspect of the invention, there is provided a coated substrate, including a first lubricious coating layer overlying the substrate, in which the first lubricious coating layer includes a first lubricant providing to the first lubricious coating layer a first coefficient of friction; and a second lubricious coating layer overlying the first lubricious coating layer, in which the second lubricious coating layer includes a second lubricant providing to the second lubricious coating layer a second coefficient of friction, and in which the second coefficient of friction is greater than the first coefficient of friction. In accordance with this aspect of the invention, the respective concentrations of lubricants may not be as described above in the first embodiment, but the net effect remains the same, that the coefficient of friction of the outer layers is greater than the coefficient of friction of the inner layer or layers.

In accordance with the invention, there is provided a coated substrate, including a first lubricious coating layer overlying the substrate, the first lubricious coating layer including a first lubricant providing to the first lubricious coating layer a first coefficient of friction; and a second lubricious coating layer overlying the first lubricious coating layer, the second lubricious coating layer including a second lubricant providing to the second lubricious coating layer a second coefficient of friction, in which the second coefficient of friction is greater than the first coefficient of friction.

As noted above, in one embodiment, the first and second lubricants may be the same lubricant. When the lubricant is the same in both (or more) layers, then the lubricant is present in the first lubricious coating layer at a concentration greater than the concentration of the lubricant in the second lubricious coating layer. Where additional layers are present, the outermost layer has the lowest concentration of the lubricant, when the lubricant is the same in the outermost layer as in underlying layers.

In another embodiment, the first and second lubricants are different lubricants. In this embodiment, two different variations can be present. In one variation, the first lubricant has a first lubricity the second lubricant has a second lubricity and the first lubricity is lower than the second lubricity. In this variation, since the first lubricity is in the first, inner, layer, in order for the coefficient of friction relationship to be maintained, the first lubricant should be present in the first lubricious coating layer in a concentration sufficient to provide to the first lubricious coating layer as a whole a greater lubricity (and a lower coefficient of friction) than the lubricity the second lubricant provides to the second lubricious coating layer (which in turn has the higher coefficient of friction).

In the other variation, the first lubricant has a first lubricity the second lubricant has a second lubricity and the first lubricity is greater than the second lubricity. In this variation, the relative concentrations of lubricant may have any relationship, as long as the lubricity of the first lubricious coating layer as a whole is greater than the lubricity of the second lubricious coating layer as a whole. As will be understood, another way to describe the resulting relationship is to again state that the coefficient of friction of the first lubricious coating layer remains lower than the coefficient of the second lubricious coating layer.

In another embodiment, the coated substrate further includes a third lubricious coating layer overlying the second lubricious coating layer. In this embodiment, the third lubricious coating layer includes a third lubricant providing to the third lubricious coating layer a third coefficient of friction, in which the third coefficient of friction is greater than to the second coefficient of friction. Additional coating layers may be applied. Thus, the coated substrate may further include at least two additional coating layers overlying the second lubricious coating layer, in which each subsequent coating layer includes a lubricant which provides to the respective subsequent coating layer a coefficient of friction greater than that of each preceding coating layer. The foregoing descriptions apply to the relationships of lubricant concentration and lubricant identity or difference, again with the proviso that the coefficient of friction of the third (and any subsequent) coating layers is greater than the coefficient of friction of the layers over which the third (and any subsequent) coating layers are formed.

Thus, as described above, the coated substrate includes coatings in which the inner layer (first lubricious coating layer) has greater lubricity and a lower coefficient of friction than do the layer (second lubricious coating layer) or layers (second, third and any subsequent coating layers) overlying and closer to or at the surface of the coated substrate, which outer layers have a higher coefficient of friction and lower lubricity than the layers over which they lay. As described above, additional lubricious coating layers may be applied over the two coating layers described here. Each of the successive layers coating layers overlying the second lubricious coating layer includes a lubricant which provides to the respective subsequent coating layer a coefficient of friction greater than (and a lubricity lower than) that of each preceding coating layer, over which the successive layer is applied.

Where the relationship between inner and outer layers is described in terms of the coefficient of friction, as noted above, different lubricants may be used in the two or more layers, as long as the relationship regarding the respective coefficients of friction is maintained. Each of the two or more lubricants in the two or more layers may have any concentration in a given layer, as long as the relationship regarding the respective coefficients of friction is maintained. That is, as described in the foregoing, the outer layer or layers have a higher coefficient of friction than do the inner layer or layers, whether this relationship is obtained by use of a greater concentration of lubricant in the inner layers or by use of a lubricant having a greater lubricity in the inner layers.

It is common to provide steel and other metal sheet, strip, parts, or workpieces generally, and particularly finished products, like fasteners and similar elements, with metal or metalizing coatings to protect the steel against corrosion. Typical of the coatings which can be applied are electrolytically-deposited metals such as zinc or zinc alloys, mechanically or dip-deposited metals such as zinc or zinc alloys, or chromatized or phosphatized or otherwise conversion coated zinc coatings. As is known in the art, electrolytic deposition includes electrodeposition (electroplating), electroless deposition and immersion plating.

The substrate may be coated with a base layer such as the metal or metalized (metal or alloy) coating prior to application of the first lubricious coating layer. The base layer may include one or more of a metal or alloy, conversion coating and a sealing composition, wherein the first lubricious coating layer overlies the base layer.

The metal or alloy base layer may be applied by any method, including, but not limited to, electroless plating, immersion plating and electrodeposition plating. In addition, the metal base layer may be applied by other methods, such as mechanical plating, chemical vapor deposition (CVD), atomic layer deposition (ALD), plasma vapor deposition, (PVD), sputtering, high or low temperature or pressure variations of these processes, and any other known method for applying a thin, protective metal layer over a substrate. Of course, many of these other methods are expensive and so might not be used for common mass-produced parts such as fasteners, but such methods are within the scope of the invention.

The passivating composition applied as or with or over the base layer may be any known passivating composition that will form a conversion coating. The passivating composition may include a hexavalent chromium, or may be substantially free of hexavalent chromium or may be totally free of hexavalent chromium, may include trivalent chromium, may include phosphatizing, or combinations of these and any other known methods for forming a conversion coating for passivating a metal surface or providing an anti-corrosion treatment to a metal surface. Any suitable passivating or anti-corrosion treatment appropriate to the substrate may be used. It is preferred for environmental and health reasons that the passivating composition be free of hexavalent chromium (Cr (VI) or $Cr^{+6}$).

In one embodiment, at least one of the first lubricious coating layer and the second lubricious coating layer further includes a sealing composition, a colorant, a phosphorescent composition, a fluorescent composition, or a mixture or combination of any two or more thereof. As is known in the art, a sealing composition may be used to seal the part from, e.g., atmospheric oxygen and moisture, from other corrosive agents, and/or to protect the part physically from abrasion, scratching, etc. Any known sealant can be used, as long as it is compatible with the coating materials and lubricating materials, which can be readily determined by those of skill in the art.

Suitable resins for forming a seal or sealant layer are disclosed below.

As is known, parts that have been treated with lubricants or otherwise need to be differentiated from parts which have not been so treated. Thus, in one embodiment, any one of the coating layers, and preferably the outer coating layer, may include an agent such as a colorant, a phosphorescent composition, a fluorescent composition, or a mixture or combination of any two or more thereof, which can be used to identify treated parts. Such methods are commonly used in the fastener art, so need not be described in detail here.

Any suitable material may be used as the lubricant(s) in accordance with the present invention. Thus, the coated substrate may include a lubricant which includes any of a natural or synthetic of petroleum-based wax, a vegetable fat or oil, a fluorinated polymer, a polyolefin polymer, molybdenum sulfide, tungsten disulfide, silver, graphite, soapstone, a stearate, a dithiophosphonate, a calcium based grease, a reactive white solid lubricant, or a mixture or combination of any two or more thereof. Tabulations of such lubricants exist in several publications including Volume 18 of the ASM Handbooks, the Kirk Othmer Encyclopedia of Chemical Technology, the Modern Tribology Handbook Vol. 1 and Vol. 2.

In one embodiment, at least one of the first lubricious coating layer and the second lubricious coating layer further comprises a binder. Any suitable binder may be used. For example, the binder may include one or more of an epoxy, an acrylic, a silicone, a phenolic resin, an inorganic silicate, waterglass and cellulose.

In one embodiment, at least one of the first lubricious coating layer and the second lubricious coating layer further comprises a curable resin. Any suitable curable resin may be used. For example, the curable resin may include one or more of phenolic based resins, polyurethanes, thermoplastics, polyamide resin, polyimide resin, alkyd resins, acrylic resins (including acrylic and alkacrylics such as (meth)acrylics and (eth)acrylics), epoxy resins and thermosetting resins. Other known resins may be suitably used.

These resins may be used to form a dry film lubricant and an integral seal layer. Thus, in one embodiment, at least one of the first lubricious coating layer and the second lubricious coating layer includes or is in the form of a dry film lubricant. In another embodiment, at least one of the first lubricious coating layer and the second lubricious coating layer includes or is in the form of an integral seal layer.

As noted above, in various embodiments of the present invention, the substrate is a metal. In one particular embodiment, when the substrate is a metal such as steel, the substrate has a surface and the surface has formed thereon one of the following (A), (B) or (C): (A) one or more layer of a metal or alloy is on the surface and the first lubricious coating layer is on the one or more layer of metal or alloy; (B) a layer of a conversion coating is on the surface and the first lubricious coating layer is on the layer of a conversion coating or (C) one or more layer of a metal or alloy is on the surface, a layer of a conversion coating is on the one or more layer of metal or alloy and the first lubricious coating layer is on the layer of a conversion coating.

Figure 8:
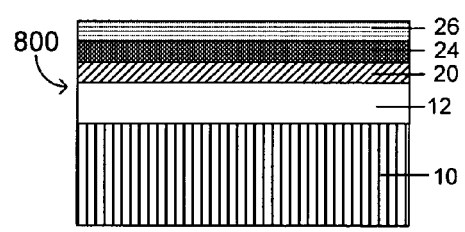

In another embodiment, the present invention provides an article, including a substrate, such as a metal article; a layer (a) of zinc or zinc alloy on at least a portion of the substrate; a layer (b) of a trivalent chromium conversion coating overlying the layer (a); a first lubricant-containing layer (c) overlying the layer (b); and a second lubricant-containing layer (d) overlying the layer (c), wherein the layer (c) comprises a coefficient of friction lower than a coefficient of friction of the layer (d). This embodiment is illustrated in FIG. 8, which is described further below. In this embodiment, the first lubricant and the second lubricant may be any lubricant disclosed herein, each in a concentration as needed to provide the coefficient of friction relationship in accordance with the invention. In one preferred embodiment, the layers (a) and (b) are formed from an emulsion containing trivalent chromium and an emulsifiable high density polyethylene (HDPE), in which the HDPE has an average particle size less than about 50 nanometers. In one embodiment of the process, the layers (b) and (c) are formed from a first composition, and the layer (d) is formed from a second composition. The layer (d) may be formed from any suitable lubricant. In one preferred embodiment, the layer (d) is formed from a mixture of an organic sealant and the second lubricant. The second lubricant may be or comprise one or more of any of the lubricants disclosed above. In one embodiment, the layer (d) forms an integral seal layer and/or is a dry film lubricant.

Figure 11:
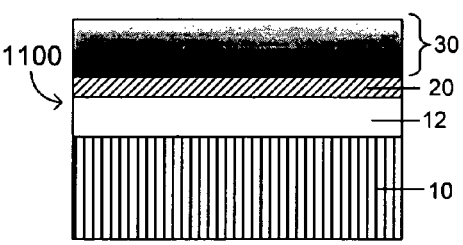

In another embodiment, the present invention provides an article, including a substrate; a layer (a) of zinc or zinc alloy on at least a portion of the substrate; a layer (b) of trivalent chromium conversion coating overlying the layer (a); and a lubricant-containing layer (c) overlying the layer (b), in which the layer (c) includes an inner surface contacting or overlying the layer (b) and an outer surface facing away from the layer (b) and contains a lubricant, in which the lubricant imparts a lower coefficient of friction at the inner surface than at the outer surface. This embodiment is illustrated in FIG. 11, which is described further below.

There are a number of ways to obtain this gradation of the coefficient of friction from the inner to the outer portion of the lubricant-containing layer (c). In one, the lubricant-containing layer (c) (which may be referred to as a composite coating layer) contains one or more lubricant that is present in a concentration gradient, in which the concentration(s) of the one or more lubricant decreases from the inner surface to the outer surface. In another, the lubricant-containing layer (c) contains more than one lubricant in a mixture, and the lubricant mixture is formed to have a higher lubricity at the inner portion than at the outer portion of the layer (c). In still another, one or more lubricant having a higher lubricity is in the inner portion of the layer (c), and one or more lubricant having a lower lubricity is in the outer portion of the layer (c).

The gradation of the coefficient of friction in this embodiment may be obtained, for example, by first applying the appropriate lubricants in discrete layers and then treating the layers, for example, by heating them or exposing them to some other energy form, to cause the layers to at least partially diffuse together with each other, at least at the interfaces between adjacent lubricant-containing layers. The gradation of coefficient of friction can also be obtained by successive dips in compositions containing successively reduced lubricant concentration, whereby a series of layers are formed each having a successively lower lubricant content and/or a successively higher coefficient of friction, moving outwardly from the substrate. In one embodiment, the successive lubricious coating layers, two or more in number, can be heated or otherwise treated to form the gradation. When this is accomplished by heating, it will be recognized that excessive heating, in terms of either or both of time and temperature, can eventually result in the homogenization of the lubricants and thus the gradation will be lost. This is undesirable and to be avoided.

In this embodiment, the lubricants used to obtain the gradation of the coefficient of friction may be any of the lubricants described herein.

Typical of the parts handled in accordance with the present invention are fasteners such as bolts, screws, nuts, fastening elements of other types like hinges, connectors, hook-type fasteners and the like, and all kinds of hardware, fixtures and fittings, including door, cabinet, kitchen, commercial, industrial and agricultural hardware and fittings.

In addition to the foregoing, prior to any of the foregoing process steps in any of the embodiments, the substrates may be cleaned by various methods. For example, substrates may be degreased, washed, dried, pickled, etc. Pickling may be carried out by any well-known pickling process, such as by using mineral inorganic acids, such as hydrochloric acid, sulfuric acid, nitric acid, and hydrofluoric acid, either individually or as mixtures.

FIGS. 5-11 are cross-sectional schematic views of metal treatments and lubricating layers applied to the surface of a metallic substrate in accordance with several embodiments of the present invention. The embodiments illustrated in FIGS. 5-11, and variations thereof, are discussed in the following. In these descriptions, the substrate is generally described as a "solid substrate", which includes any solid substrate, such as a thermoplastic substrate, a thermosetting substrate, a ceramic substrate or a metal or metal alloy substrate, or any other solid substrate to which the present invention may be applicable. In an embodiment in which the solid substrate is a polymer, glass or ceramic, it may include a metal coating on the surface of the substrate, to which the treatments and/or coatings discussed herein may be applied.

Figure 5:
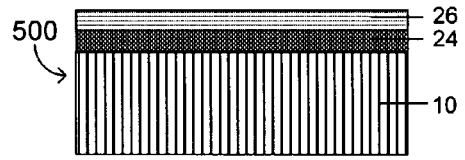
FIGS. 5-11 are cross-sectional schematic views of metal treatments and lubricating layers applied to the surface of a metallic substrate in accordance with several embodiments of the present invention.

FIG. 5 schematically depicts an article 500 in accordance with the present invention, including a solid substrate 10, a first lubricious coating layer 24 overlaying the substrate 10 and a second lubricious coating layer 26 overlaying the first lubricious coating layer 24. In accordance with the invention, the first lubricious coating layer 24 includes a first lubricant providing to the first lubricious coating layer a first coefficient of friction; and the second lubricious coating layer 26 includes a second lubricant providing to the second lubricious coating layer a second coefficient of friction, and the second coefficient of friction is greater than the first coefficient of friction. The lubricant-containing coating layers 24 and 26 may contain any suitable lubricant for such uses. A seal layer (not shown) may be formed over the lubricant layers, or the lubricant may be an integral part of the seal layer, in which case, for example, the outer, second lubricious coating layer 26 would be a seal/lubricant layer, which may be referred to as an integral seal layer. Either or both of the first lubricious coating layer 24 and the second lubricious coating layer 26 may be integral seal layers, as long as the features of the invention described herein still apply. The seal layer described here may be formed on any of the following embodiments, so is not specifically mentioned with respect to them, but it should be understood as being an optional addition to what is described. In addition, any of the lubricious coatings may be present as an integral seal layer, although this is not specifically described for each following embodiment. Thus, in one embodiment, the integral seal is the outermost layer. In another embodiment, integral seal layers can be stacked, and in one such embodiment the innermost integral seal has a higher concentration of lubricant or lower coefficient of friction than subsequent outer or further outwardly placed integral seal layers.

The embodiment illustrated in FIG. 5 is the basic embodiment of the present invention, and the remaining embodiments build on this basic embodiment by addition of further treatments and/or coatings. Various combinations of and variation on the following exemplary embodiments may be identified by those of skill in the art, and all such combinations and variations are within the scope of the present invention, as defined by the claims appended hereto.

Figure 6:
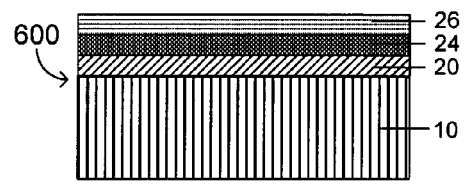

FIG. 6 schematically depicts an article 600 in accordance with the present invention, including a solid substrate 10, a conversion coating layer 20, a first lubricious coating layer 24 overlaying the conversion coating layer 20 and a second lubricious coating layer 26 overlaying the first lubricious coating layer 24. In accordance with the invention, the first lubricious coating layer 24 includes a first lubricant providing to the first lubricious coating layer a first coefficient of friction; and the second lubricious coating layer 26 includes a second lubricant providing to the second lubricious coating layer a second coefficient of friction, and the second coefficient of friction is greater than the first coefficient of friction. The lubricant-containing coating layers 24 and 26 may contain any suitable lubricant for such uses. The conversion coating layer 20 may be any such layer described herein, and in one preferred embodiment is other than a hexavalent chromium conversion coating, for example, a trivalent chromium conversion coating.

Figure 7:
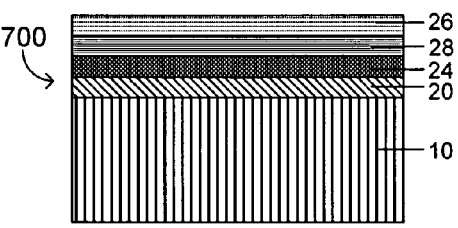

FIG. 7 schematically depicts an article 700 in accordance with the present invention, including a solid substrate 10, a conversion coating layer 20, a first lubricious coating layer 24 overlaying the conversion coating layer 20, a second lubricious coating layer 26 overlaying the first lubricious coating layer 24, and a third lubricious coating layer 28 between the first lubricious coating layer 24 and the second lubricious coating layer 28. In accordance with the invention, the first lubricious coating layer 24 includes a first lubricant providing to the first lubricious coating layer a first coefficient of friction; and the second lubricious coating layer 26 includes a second lubricant providing to the second lubricious coating layer a second coefficient of friction, and the second coefficient of friction is greater than the first coefficient of friction. In accordance with this embodiment of the invention, the third lubricious coating layer 28 provides an intermediate coefficient of friction—that is—a coefficient of friction that is greater than that of the first lubricious coating layer 24 but less than that of the second lubricious coating layer 26. The lubricant-containing coating layers 24, 26 and 28 may contain any suitable lubricant for such uses. The conversion coating layer 20 may be any such layer described herein, and in one preferred embodiment is other than a hexavalent chromium conversion coating, for example, a trivalent chromium conversion coating.

The embodiment of FIG. 8 is substantially similar to that of FIG. 6, except that it includes a metal or alloy layer 12, formed on the surface of the substrate 10. Thus, FIG. 8 schematically depicts an article 800 in accordance with the present invention, including a solid substrate 10, a metal or alloy layer 12, a conversion coating layer 20, a first lubricious coating layer 24 overlaying the conversion coating layer 20 and a second lubricious coating layer 26 overlaying the first lubricious coating layer 24. In accordance with the invention, the first lubricious coating layer 24 includes a first lubricant providing to the first lubricious coating layer a first coefficient of friction; and the second lubricious coating layer 26 includes a second lubricant providing to the second lubricious coating layer a second coefficient of friction, and the second coefficient of friction is greater than the first coefficient of friction. The lubricant-containing coating layers 24 and 26 may contain any suitable lubricant for such uses. The metal or alloy layer 12 may be formed on the surface of the substrate 10 by any suitable method, such as those methods described above. The conversion coating layer 20 may be any such layer described herein, and in one preferred embodiment is other than a hexavalent chromium passivant, for example, a trivalent chromium passivant.

Figure 9:
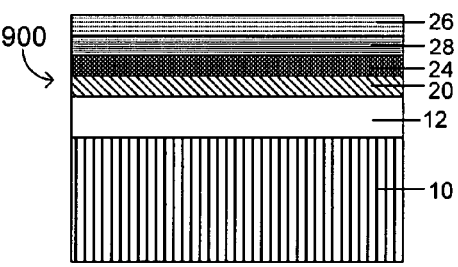

The embodiment of FIG. 9 is substantially similar to that of FIG. 7, except that it includes a metal or alloy layer 12, formed on the surface of the substrate 10. Thus, FIG. 9 schematically depicts an article 900 in accordance with the present invention, including a solid substrate 10, a metal or alloy layer 12, a conversion coating layer 20, a first lubricious coating layer 24 overlaying the conversion coating layer 20, a second lubricious coating layer 26 overlaying the first lubricious coating layer 24, and a third lubricious coating layer 28 between the first lubricious coating layer 24 and the second lubricious coating layer 28. In accordance with the invention, the first lubricious coating layer 24 includes a first lubricant providing to the first lubricious coating layer a first coefficient of friction; and the second lubricious coating layer 26 includes a second lubricant providing to the second lubricious coating layer a second coefficient of friction, and the second coefficient of friction is greater than the first coefficient of friction. In accordance with this embodiment of the invention, the third lubricious coating layer 28 provides an intermediate coefficient of friction—that is—a coefficient of friction that is greater than that of the first lubricious coating layer 24 but less than that of the second lubricious coating layer 26. The lubricant-containing coating layers 24, 26 and 28 may contain any suitable lubricant for such uses. The metal or alloy layer 12 may be formed on the surface of the substrate 10 by any suitable method, such as those methods described above. The conversion coating layer 20 may be any such layer described herein, and in one preferred embodiment is other than a hexavalent chromium passivant, for example, a trivalent chromium passivant.

Figure 10:
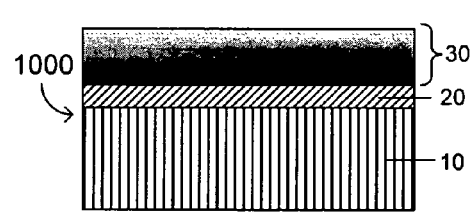

The embodiment of FIG. 10 is substantially similar to that of FIG. 7, except that it includes a composite lubricious coating 30, rather than the three distinct coating layers 24, 28 and 26 as in the FIG. 7 embodiment. Thus, FIG. 10 schematically depicts an article 1000 in accordance with the present invention, including a solid substrate 10, a conversion coating layer 20, and a composite coating layer 30 overlaying the conversion coating layer 20. The composite coating layer includes one or more lubricants and exhibits a gradation of coefficient of friction that varies with depth, the coefficient of friction close to the passivating layer 20 being the lowest and the coefficient of friction close to and at the surface being the highest. In accordance with this embodiment of the invention, the composite coating layer 30 has an inner surface adjacent the conversion coating layer 20 and an outer surface. The composite coating layer 30 includes a lubricant having a distribution within the composite coating layer 30 which imparts a lower coefficient of friction at the inner surface than at the outer surface. In accordance with this embodiment of the invention, the composite coating layer 30 provides the benefits of the present invention, i.e., an outer surface having a higher coefficient of friction than an inner portion of the layer, but does so within a single composite layer. The composite layer can be formed, for example, by application of heat to an embodiment containing two or three or more distinct layers for a period sufficient to cause the distinct layers to diffuse together, or at least for the interfaces of these layers to at least partially merge together. The initially formed lubricant-containing coating layers may contain any suitable lubricant or combination of lubricants for such uses, as described in this disclosure. The conversion coating layer 20 may be any such layer described herein, and in one preferred embodiment is other than a hexavalent chromium passivant, for example, a trivalent chromium passivant.

In one embodiment (not shown), the composite coating layer 30 may be directly on the substrate 10, with no intervening conversion coating layer or metal layer. Thus, this embodiment would appear similar to FIG. 5, except that the two lubricious coating layers 24 and 26 would be replaced by the composite coating layer 30.

The embodiment of FIG. 11 is substantially similar to that of FIG. 10, except that it includes a metal or alloy layer 12, over which the conversion coating layer 20 is formed. FIG. 11 schematically depicts an article 1100 in accordance with the present invention, including a solid substrate 10, a metal or alloy layer 12, a conversion coating layer 20, and a composite coating layer 30 overlaying the conversion coating layer 20. The composite coating layer includes one or more lubricants and exhibits a gradation of coefficient of friction that varies with depth, the coefficient of friction close to the passivating layer 20 being the lowest and the coefficient of friction close to and at the surface being the highest. In accordance with this embodiment of the invention, the composite coating layer 30 has an inner surface adjacent the conversion coating layer 20 and an outer surface. The composite coating layer 30 includes a lubricant having a distribution within the composite coating layer 30 which imparts a lower coefficient of friction at the inner surface than at the outer surface. In accordance with this embodiment of the invention, the composite coating layer 30 provides the benefits of the present invention, i.e., an outer surface having a higher coefficient of friction than an inner portion of the layer, but does so within a single composite layer. The composite layer can be formed, for example, by application of heat to an embodiment containing two or three or more distinct layers for a period sufficient to cause the distinct layers to diffuse together, or at least for the interfaces of these layers to at least partially merge together. The initially formed lubricant-containing coating layers may contain any suitable lubricant or combination of lubricants for such uses, as described in this disclosure. The conversion coating layer 20 may be any such layer described herein, and in one preferred embodiment is other than a hexavalent chromium conversion coating, for example, a trivalent chromium conversion coating.

The sealant materials used with embodiments of the present invention may be inorganic, organic or a mixture of inorganic and organic.

Inorganic sealants are typically aqueous solutions of silicates such as sodium, potassium or lithium silicate where the Si to O ratio may vary. These silicates may be used alone or in combination with silica ($SiO_2$) particles whose surface properties have been modified. Suitable silicates are available from PQ Corporation (http://www.pqcorp.com/products/ProductsbyProductline.asp). Silica with surface modification is available from W.R. Grace (http://www.grace.com/davison/industrial.html) under the trademark LUDOX® silica.

Specific final seal organic materials that are considered useful include NEOREZ® R 961, NEOCRYL® A 6092 and HALOFLEX® 202 and we have added, in some cases the inorganic LUDOX® HS40, for example. Other brands and similar resins may also be used.

Organic sealants are typically aqueous solutions of polymer resins based on acrylic emulsions, waterborne urethanes, waterborne urethane/acrylic copolymers, and vinyl/acrylic terpolymer emulsions. DSM NeoResins (http://www.neoresins.com/script/P_products_hoofdgroep.asp?region=2&HfdGrID=8) manufactures and markets such resins for the coatings industry under the trade names NEOCRYL®, NEOREZ®, NEOPAC®, and HALOFLEX® respectively. For example, NEOREZ® R 961 includes a waterborne polyurethane and HALOFLEX® 202 includes vinyl/acrylic terpolymer emulsion resins.

Commercially available integral seals include, for example, a fluoropolymer/phenolic coating such as EMRALON® 330, 20% v/v in methyl ethyl ketone (MEK) available from Acheson Colloids Co., Port Huron, Mich. Other suitable integral seals may be used, as are known in the art. The lubricant content of these coatings can be adjusted to provide first and second lubricious coatings in accordance with the present invention.

In addition to the foregoing, paint layers containing lubricants can be used as the lubricious coating layers of the present invention. For example, Trutec (http://www.trutecind.com/coat/lube.htm) distributes lubricant containing paints from Dow Corning, under the MOLYKOTE® trade name and from Nihon Parkerizing (DEFRIC trade names). The MOLYKOTE® product contains $MoS_2$ as a solid lubricant, and it is believed that the DEFRIC contains a polyfluorocarbon lubricant.

Specific final seal inorganic materials that are considered useful include PQ sodium silicate (N Grade), potassium silicate (K Sil), and lithium silicate with and without LUDOX® HS40 silica.

Lubricants used in the final seals need not be emulsifiable although the lubricants used in the conversion coating compositions need to be emulsifiable if they are not soluble. The lubricants in the final seals need not even be miscible. As long as the lubricant can be suspended, it can be applied to the substrate. As such the lubricant should be solid or liquid. There are a wide variety of lubricants and lubricants are often classified by source:

animal (e.g., sperm oil, goose grease), vegetable (e.g., soybean oil, linseed oil), mineral (e.g., molybdenum sulfide, graphite, finely divided metal powders, e.g., silver or zinc), petroleum (e.g. oil or grease distillates or still bottoms)

synthetic (e.g. polyethylene, polytetrafluoroethylene, silicones, etc.).

Specific lubricants that are considered useful include the above-noted FUCHS LUBRITECH® additive, and synthetic lubricants including the Michelman HDPE and the NiSlip 500D PTFE suspensions. These lubricants may be added to organic and inorganic final seal materials.

Figure 12:
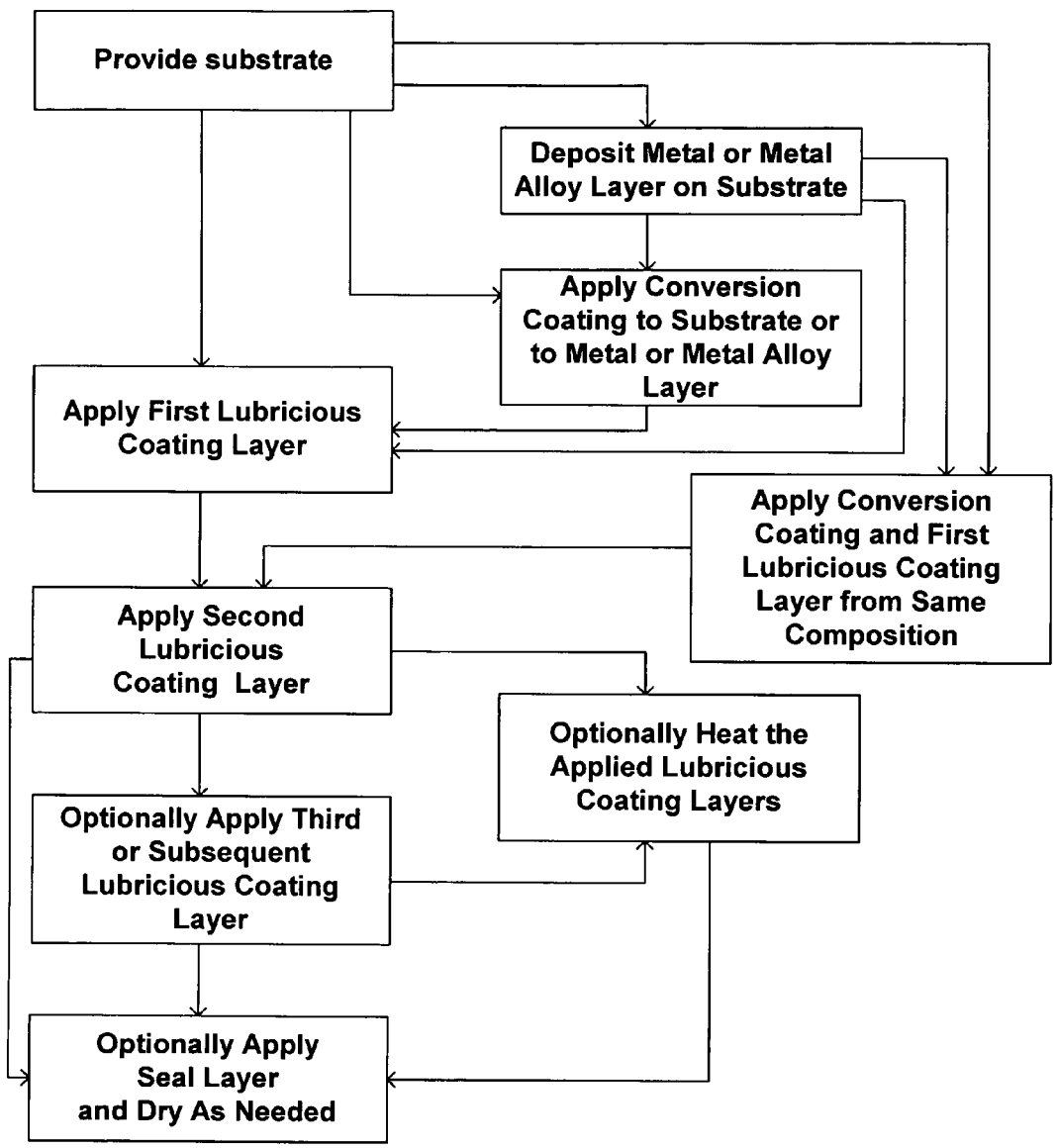
FIG. 12 is a schematic process flow diagram illustrating various exemplary processes for applying a lubricious coating to a substrate, in accordance with the invention.

FIG. 12 is a schematic process flow diagram illustrating various exemplary processes for applying a lubricious coating to a substrate, in accordance with the invention. The following description provides some details relating to the various process steps and options summarized in FIG. 12.

As shown in FIG. 12, the present invention provides several variations on processes to form the coated substrate by applying a lubricious coating to a substrate. In one embodiment, the process for applying a lubricious coating to a substrate includes applying a first lubricious coating layer over the substrate, the first lubricious coating layer including a first lubricant providing to the first lubricious coating layer a first coefficient of friction; and then applying a second lubricious coating layer over the first lubricious coating layer, the second lubricious coating layer including a second lubricant providing to the second lubricious coating layer a second coefficient of friction. In accordance with the present invention, the second coefficient of friction is greater than the first coefficient of friction, thus providing a lubricious coating to the substrate where there is greater lubricity in the inner layers or portions of the lubricious coating than in the outer layers or portions of the coating. Generally, the process may include at least one step of drying the first lubricious coating layer and/or the second lubricious coating layer. The drying may be carried out by any appropriate method, and may be preceded by a rinse step, in which the coated part is rinsed, e.g., with water and is then dried. Alternatively, the coated part may be rinsed and then subjected to further processing, such as adding further lubricant layer(s), without drying prior to the final step of coating. As will be understood, at least as a final step, such coated metal parts are generally dried or are simply allowed to dry.

As shown in FIG. 12, the process may further include applying at least one additional coating layer over the second lubricious coating layer. In accordance with the present invention, the at least one additional coating layer may include a lubricant providing a coefficient of friction greater than that of the second coefficient of friction.

As described above, in one embodiment, the article includes a metal layer over the surface of the substrate, and thus, the process may further include applying at least one metal or alloy layer over the substrate, as is shown in FIG. 12. As described above, any known method may be used to apply the metal layer. In one preferred embodiment, when the substrate is steel, the metal layer is zinc or an alloy of zinc. The zinc or zinc alloy may be applied, for example, by one or more of electrodeposition, immersion plating or electroless plating.

As described above and shown in FIG. 12, the process may further include applying at least one base layer of a conversion coating over the substrate, and this may be done, for example, by immersing the substrate into a composition including at least one passivant and/or at least one anti-corrosive. It is preferred that the passivant be other than hexavalent chromium. In one preferred embodiment, the conversion coating is formed by a trivalent chromium treatment. In one preferred embodiment, when the substrate is steel, a zinc or zinc alloy layer is first applied, and then a trivalent chromium conversion coating is applied to the zinc or zinc alloy layer. Other known conversion coating materials and methods may be used.

In one embodiment, the first lubricant is emulsified or dispersed in the composition including at least one passivant and/or at least one anti-corrosive. Then, when the substrate is removed from the composition, the base layer is on the substrate and the first lubricant-containing coating layer forms on the base layer which is the passivating layer.

A process in accordance with another embodiment of the invention can also be described as follows. A process for applying a lubricious coating to a substrate, including immersing a substrate in a first composition including a first lubricant; removing the substrate from the first composition, to form a first lubricious coating layer containing the first lubricant over the substrate; immersing the substrate with the first lubricious coating layer thereon in a second composition including a second lubricant, to form a second lubricious coating layer over the first lubricious coating layer, in which the first lubricious coating layer provides a first coefficient of friction and the second lubricious coating layer provides a second coefficient of friction, and, in accordance with the invention, the first coefficient of friction is lower than the second coefficient of friction. Of course, other methods than immersion in a lubricant-containing composition may be used to apply the second lubricious coating layer. For example, the first or second lubricious coating layer may be formed by spraying, brushing or other known means for applying a coating layer to a substrate. Dipping or immersing is most often used, particularly for mass-produced parts such as fasteners. The dipping or immersing may be carried out using any appropriate equipment.

In one embodiment, as described above and shown in FIG. 12, the first composition may further include a passivant or anti-corrosive and, when the substrate is removed from the first composition, a base layer including the passivant or anti-corrosive is formed on the substrate and the first lubricious coating layer is formed on the base layer. As above, the first lubricant may be emulsified or dispersed in the first composition. As above, one or more of a metal or an alloy may be applied to the surface of the substrate, a passivant or anti-corrosive may be applied as a base layer, with the base layer formed on the metal and the first lubricious coating layer overlies the base layer.

In another embodiment, also shown in FIG. 12, the coating layers may be treated to form a less distinct separation between layers in which a gradient of coefficient of friction is formed. The same basic relationship is maintained; that is, in the layers, a lower coefficient of friction remains nearer the surface of the substrate while a higher coefficient of friction remains nearer the outer surface of the article so coated. To obtain this gradient in a composite coating layer, following the step of applying the second lubricious coating layer, the coated substrate may be heated or otherwise treated to cause diffusion between the first lubricious coating layer and the second lubricious coating layer. This treatment may result in a gradient being formed in a composite coating layer, in which the layer includes a lower coefficient of friction adjacent the base layer and a higher coefficient of friction in outer portions of the gradient layer. This treatment may simply result in a partial diffusion between the respective coating layers, for example, in the region of the interface between the layers, in which some portion or a major portion of each layer retains its original composition, separated from each other by a diffusion region.

Where a gradient layer is established, the coefficient of friction of the gradient coating layer may gradually increase from adjacent the substrate surface or base layer (where one is present) towards an outer surface of the composite coating layer.

The process can also be described in terms of the lubricity of the layers rather than in terms of the coefficient of friction. Thus, the process may be described as a process for applying a lubricious coating to a substrate, including immersing a substrate in a first composition containing a first lubricant; removing the substrate from the first composition, to form a first lubricious coating layer containing the first lubricant over the substrate; applying a second lubricious coating layer containing a second lubricant over the first lubricious coating layer, in which the first lubricious coating layer exhibits a first lubricity and the second lubricant exhibits a second lubricity and the first lubricity is greater than the second lubricity. The same descriptions of variations and additional steps as set forth above applies to this embodiment as well.

It should be understood that, in accordance with the present invention, at least one inwardly disposed lubricating layer or portion of a layer has a lower coefficient of friction than at least one outwardly disposed lubricating layer. However, this does not mean that the outermost lubricious coating is necessarily of the highest coefficient of friction. Thus, where a part is formed meeting the description given above, i.e., a first lubricious coating layer overlying the substrate, the first lubricious coating layer including a first lubricant providing to the first lubricious coating layer a first coefficient of friction; and a second lubricious coating layer overlying the first lubricious coating layer, the second lubricious coating layer including a second lubricant providing to the second lubricious coating layer a second coefficient of friction, wherein the second coefficient of friction is greater than the first coefficient of friction, the part or article so coated may be coated on its outermost surface with a highly lubricious material, e.g., a liquid petroleum-based material, having a lower coefficient of friction than any underlying layer, and still be within the scope of the present invention.

Having described the articles and processes generally in the foregoing, in the following some specific examples are provided. These examples are provided to illustrate the invention and are not intended to limit the invention, which is limited only by the scope of the claims appended hereto.

One exemplary process for applying two lubricious coating layers in accordance with the present invention as disclosed above is as follows:

For a non-conversion coated part:

1. Immerse the solid substrate (as defined above) in a fluoropolymer/phenolic coating such as EMRALON® 330, 20% v/v in methyl ethyl ketone (MEK) from Acheson Colloids Company (www.achesonindustries.com/doc/guides/FrictionFighterSelectionGuide.pdf).

2. Cure for 60 minutes at 130° C. (dip, spin dry, oven cure at 130° C.).

3. Then immerse the part with the first lubricious coating layer in an aqueous solution containing EMRALON® 8301-01, a polyurethane resin with fluoropolymer, at 20% v/v in water.

4. Cure for 30 minutes at 100° C. (dip, spin dry at 100° C.).

Thus there are formed two coating layers on a non-conversion coated metal surface. A part thus coated would typically have a top layer having a coefficient of friction of ~0.1, and an inner layer having a coefficient of friction of ~0.06 to 0.08. The limiting service temperature is ~200° C. To obtain these two layers and to maintain them as separate layers, the curing temperature of the second step should not be so high as to significantly reduce the lubricating function of the first layer. In one embodiment, the curing temperature of the second step does not exceed the curing temperature of the first step.

Additional processes in accordance with the invention are set forth in the following examples.

EXAMPLES

Many methods exist to measure lubricity. To demonstrate the effectiveness of the present invention, in the following examples, the friction coefficient is measured by different methods. Coefficient of friction should be consistently measured and values obtained should not be compared if generated by different test methods. That is, the same test should be used for measurement of coefficient of friction if the results are to be compared between tests.

In Example 1, three steel hull cell panels are treated as follows: (1) using a conventional treatment method including zinc plating, trivalent chrome passivation, and application of an organic seal containing no lubricant; (2) using a conventional treatment method including zinc plating, trivalent chrome passivation (conversion coating), and application of an organic seal containing a lubricant dispersed in a solvent, and (3) in accordance with the present invention, by zinc plating, treatment in a trivalent passivant containing a lubricant producing a lubricant rich layer to form a conversion coating and a first lubricious coating layer, followed by application of an organic seal containing a diluted lubricant, to form a second lubricious coating layer.

In Example 2, bolts with differing geometry are simultaneously treated using the conventional treatment methods and the principles of this invention, as described below, and torque at specified clamp loads as well as coefficient of friction are measured using torque tension test apparatus.

In Example 3, bolts are treated by zinc plating, followed by trivalent passivation (conversion coating), followed by a series of applications of organic integral lubricant seals containing differing amounts of lubricant. The torque values and apparent coefficients of friction are again measured using torque tension testing.

In Example 4, test pins are coated in a series of electroless nickel solutions with varying amounts of polytetrafluoroethylene (PTFE) fluorocarbon and subjected to Falex wear test to determine wear rate and coefficients of friction.

In Example 5, bolts of different geometry are processed at the factory scale where handling damage might affect subsequent corrosion or torque tension properties and the resulting corrosion properties and torque tension properties evaluated by independent laboratories.

The base chemical solutions used in Examples 1-5 are described below:

| Solution A - Trivalent chromium passivant: | |
|---|---|
| | Grams |
| Water | 96.000 |
| NaF | 0.296 |
| Cr(NO$_3$)$_3$ solution (McGean Rohco Chemical Co.) | 2.400 |
| cobalt nitrate heptahydrate | 0.816 |
| malonic acid | 0.080 |
| concentrated sulfuric acid | 0.033 |
| Nitric acid 42° Baume | 0.374 |

| Solution B - Corrosion resistant seal | |
|---|---|
| | Grams |
| Water | 76.020 |
| LUDOX ® HS40 (Grace Chemical) A siccative material | 9.240 |
| NEOREZ ® R-961 (DSM Neoresins) A curable composition | 14.740 |

Solutions C, D and E

| Constant Components of C, D and E: | |
|---|---|
| | Grams |
| lactic acid | 28 |
| malic acid | 9 |
| succinic anhydride | 13 |
| lead nitrate | 0.0008 |
| Ni as NiSO$_4$ | 5 |
| NaF | 0.2 |
| KOH | 67 |
| Na$_2$HPO$_2$ | 27 |
| DI water (after adding the variable component) | q.s. to 1 liter |

| Variable Component in C, D and E: | |
|---|---|
| NiSlip 500 D | zero in solution C |
| | 2 g/l in solution D |
| | 4 g/l in solution E |

Example 1

Steel Hull cell panels are stripped in 50% hydrochloric acid, rinsed using deionized water, then plated at 20 amps per square foot (ASF)(2.15 A/dm$^2$) in non-cyanide alkaline zinc solution to achieve a thickness of eight to ten microns.

A first panel is treated by immersion for sixty seconds in solution A (passivant) to form a conversion coating, followed by immersion for sixty seconds in solution B (corrosion resistant seal). This panel corresponds to applying a resin seal layer directly over the conversion coating.

A second panel is treated by immersion for sixty seconds in solution A, to form a conversion coating, followed by immersion for sixty seconds in solution B to which 2 ml per liter of FUCHS LUBRITECH® Gleitmo 605 has been added. This panel corresponds to applying a conventional integral lubricant seal coating to the conversion coating.

A third panel is treated by immersion for sixty seconds in a mixture of solution A to which 2.5 ml per liter of Michelman ME 93235 emulsified lubricant has been added, to form a conversion coating covered by a first lubricious coating formed by the Michelman ME 93235, followed by immersion for sixty seconds in a mixture of solution B to which 2 ml per liter of FUCHS LUBRITECH® Gleitmo 605 has been added. This panel corresponds to an embodiment of the present invention, in which the Michelman ME 93235 lubricant forms the first lubricious coating layer on the conversion coating formed by solution A, and the integral lubricant seal containing the FUCHS LUBRITECH® Gleitmo 605 lubricant forms the second lubricious coating layer, from the solution B with the lubricant added. Each of the coatings on the first, second and third panels is about 2 microns thick in total. In one embodiment, the seal layer (with or without the lubricant) is about 1 micron thick, the passivate (conversion coating) is about 0.5 micron thick, and in the third example in accordance with the present invention, the lubricant layer formed on the conversion coating layer (corresponding to the first lubricious coating), is about 0.1-0.2 micron thick.

Figure 13:
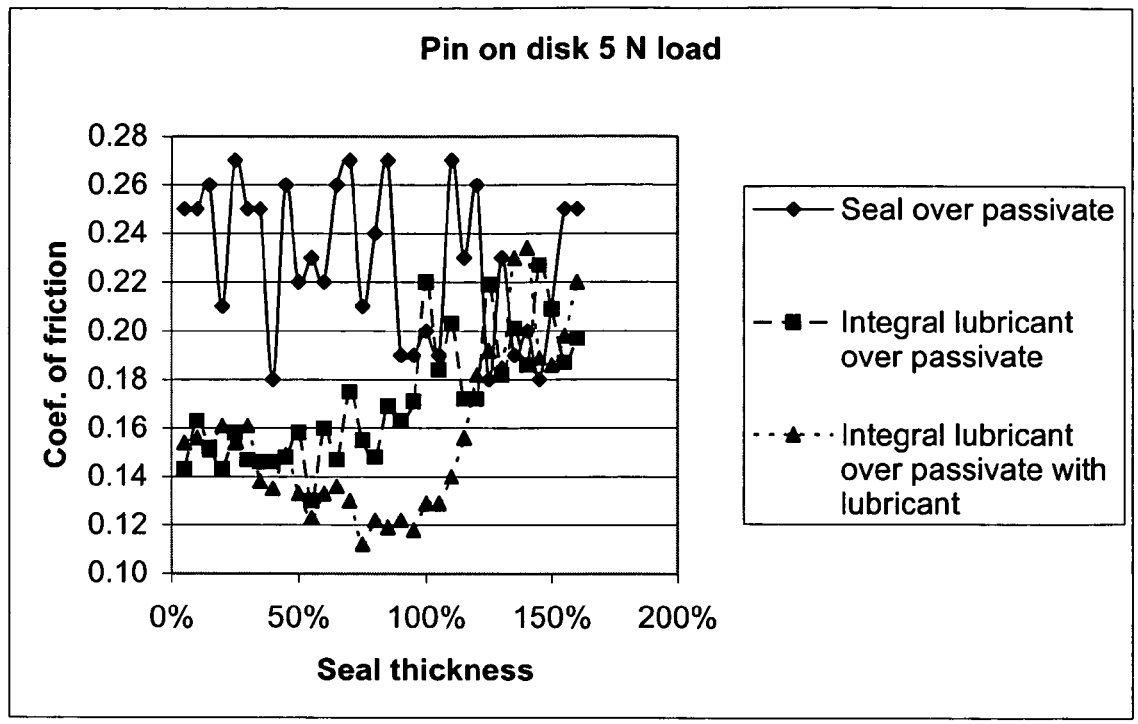
FIG. 13 is a graph showing data from a pin-on-disk test comparing prior art lubricious coatings with a lubricious coating in accordance with an embodiment of the present invention.

The coefficient of friction as a function of coating thickness is determined for each of the first, second and third panels using a Micro Photonics microtribometer equipped with a white light reflection apparatus to gauge coating thickness. FIG. 13 shows the data from the pin-on-disk test. As shown in FIG. 13, The multilayer coating with greater concentration of lubricant near the base than near the surface shows more uniform and lower overall coefficient of friction as a function of coating thickness than either the control, without lubricant, or the integrated lubricant without a lubricant gradient.

Example 2

Twenty-five unplated bolts in each of six bolt geometries,
M8×1.25×25 8.8PC captive washer bolts from Brogola part no. W701605;
M8×1.25×30 9.8PC flange head bolts from SPS Tech. part no. N606543;
M8 9.8PC flange bolts from Indiana Auto. Fastener part no. N605790;
M10×45 10.9PC flange bolts from Textron;
M10×40 9.8PC hexagonal head bolts from Wilson Garner; and
M10×65 8.8PC flange head bolts from Finnveden Bulten, are combined into an 18×10 inch-plating barrel cleaned and then plated using an acid zinc plating solution to deposit a zinc layer having a thickness of ten microns.

The bolts are then split into five groups with the six geometries of bolts in each group, with five bolts of each geometry. Each group is then treated in one of five different post plate sequences prior to Ford WZ 100 torque tension measurement with an RS Technologies torque tension device.

The five different treatment sequences consist of:
1. No post treatment.
2. Trivalent chrome solution passivation using solution A.
3. Trivalent chrome solution passivation using solution A followed by treatment with solution B to which 18.8 ml per liter of Michelman ME 93235 emulsified lubricant was added.
4. Trivalent chrome solution passivation using solution A to which 2.5 ml/l of Michelman ME 93235 emulsified lubricant was added.
5. Trivalent chrome solution passivation using passivant solution A with 2.5 ml/l of Michelman ME 93235 emulsified lubricant followed by treatment using solution B to which 12.5 ml/l of Michelman ME 93235 was added. Only this sequence (5) is in accordance with the present invention.

Figure 14:
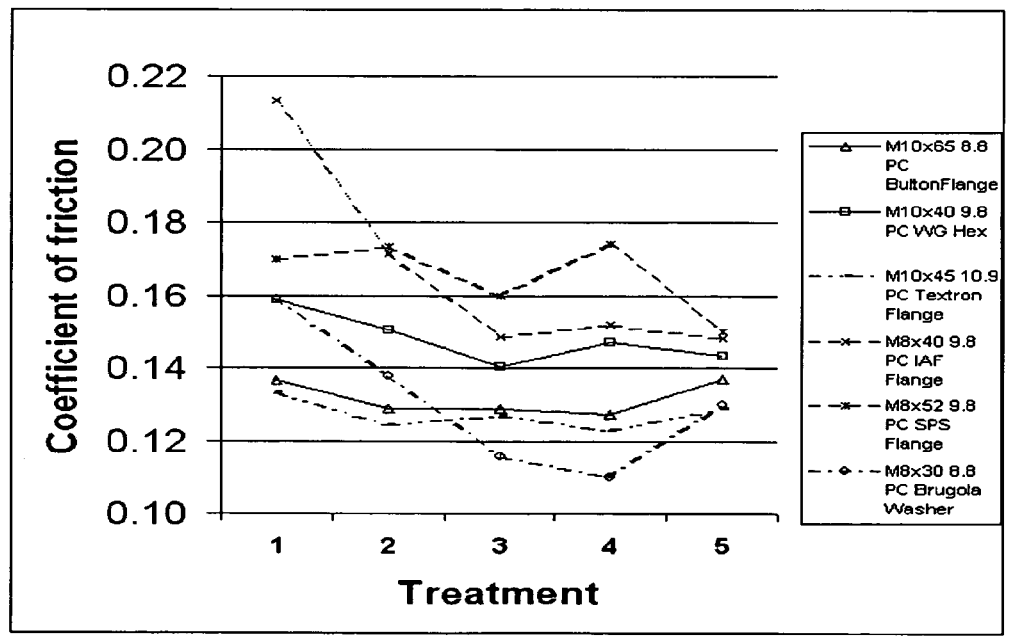
FIG. 14 is a graph showing data from determinations of torque and coefficient of friction comparing prior art lubricious coatings with a lubricious coating in accordance with an embodiment of the present invention.

After plating and processing the torque and coefficient of friction values are determined using an RS Technologies torque tension device. The data for coefficient of friction is graphed in FIG. 14. FIG. 14 is a graph showing the range of apparent overall coefficient of friction, measured using the above torque tension device for each of the five treatments above. From the graph in FIG. 14 it is evident that acceptable and uniform torque values for the dissimilar bolt geometries are only obtained by creating a coating with a less lubricous material above a more lubricous material, in accordance with the present invention, shown as treatment 5 in FIG. 14.

Example 3

In this example, each of 40 M8 9.8PC flange bolts from Indiana Automotive Fastener, part number N605790, are plated in zinc, conversion coated by dipping in the following solution, which in preparation is heated to 60° C. and held for 24 hours, allowed to cool to 130° C. and used.

| | |
|---|---|
| CrCl3 | 50 g/l |
| Co(NO$_3$)$_2$ | 3 g/l |
| NaNO$_3$ | 100 g/l |
| Oxalic acid | 30 g/l |
| Malonic acid | 60 g/l |

Following formation of the conversion coating, the parts are divided into two groups.

The first, control group, is repeatedly immersed into solution B to which 30 ml of FUCHS LUBRITECH® Gleitmo 605 has been added, and then spin dried for 15 minutes using air at 82° C. to obtain a desired thickness of integral seal coating.

The second group is treated in accordance with an embodiment of the invention, by sequentially immersing in a series of solutions containing, respectively, solution B and 240 ml of FUCHS LUBRITECH® Gleitmo 605, solution B and 120 ml of FUCHS LUBRITECH® Gleitmo 605, solution B and 60 ml/l FUCHS LUBRITECH® Gleitmo 605, then immersion into solution B containing 30 ml/l FUCHS LUBRITECH® 605, each immersion being followed by spin drying for 2 minutes using hot air drying, to obtain the same total thickness of integral seal coating as for the first, control group.

At the end of the sequential immersions, the whole integral seal layer in each of the two groups is dried for 15 minutes at 82° C. In each of these samples, Group I and Group II, the outermost lubricious coating has the same concentration of lubricant.

The coefficients of friction (COF) as a function of different clamp loads are recorded using the RS Technologies torque tension device with the following results:

| | Group 1 | | | | Group 2 | | | |
|---|---|---|---|---|---|---|---|---|
| | Clamp Load kN | | | | | | | |
| | 10 | 15.9 | 17.8 | 22 | 10 | 15.9 | 17.8 | 22 |
| High COF | 0.153 | 0.136 | 0.132 | 0.130 | 0.117 | 0.107 | 0.101 | 0.099 |
| Average COF | 0.144 | 0.131 | 0.128 | 0.124 | 0.111 | 0.101 | 0.099 | 0.094 |
| Low COF | 0.135 | 0.123 | 0.119 | 0.117 | 0.106 | 0.097 | 0.095 | 0.090 |
| Std. Dev. COF | 0.005 | 0.004 | 0.004 | 0.003 | 0.002 | 0.002 | 0.002 | 0.002 |

This data demonstrates that varying the lubricant concentration so that it is less near the surface than at the base reduces the variations in test results, and provides both more uniform and lower coefficients of friction as a function of clamp load. From the data it is also evident that acceptable standard deviations in the measured torque values for the bolts can be obtained by using different torque modification solutions or by creating a coating with a less lubricious material above a more lubricious material.

Example 4

In this example twelve steel pins are plated using electroless nickel solutions C, D, and E that contain different amounts of fluorocarbon which is codeposited in the resulting NiP alloy matrix. A multilayer coating is also prepared in which the base coating is prepared from solution E, the next layer from solution D, and the uppermost layer from solution C, so that the base layer has the highest concentration of lubricant and each of two subsequent upper layers have successively lower lubricant concentrations. To ensure that thicknesses are equivalent, the plating rates of the three solutions are determined prior to the pins being plated and the plating times adjusted to ensure equivalent final thicknesses, and the before- and after-plating diameters of the pins are measured using a micrometer. Plating temperature is 86° C. and pH is adjusted to 4.5 with sulfuric acid or ammonium hydroxide, as needed.

The profiles for each Falex test are a 30 lb (13.6 Kg) Vee block load for 30 seconds followed by a 50 lb (22.7 Kg) load for next 7½ minutes. The mass of the Vee blocks and the pins is measured before and after each test and the mass losses determined. The surface roughness, Ra, is determined before each test for each pin using a Mitutoyo SURFTEST®-501 surface profilometer. The Ra and mass loss are:

| | Pins C | Pins D | Pins E | Multilayer Pins |
|---|---|---|---|---|
| Average Ra before testing (microns) | 0.58 | 0.20 | 0.20 | 0.24 |
| Average pin mass loss (mg) | 43.57 | 35.77 | 38.70 | 36.93 |

-continued

|  | Pins C | Pins D | Pins E | Multilayer Pins |
|---|---|---|---|---|
| Average left Vee block mass loss (mg) | 2.90 | 0.97 | 0.90 | 0.50 |
| Average right Vee block mass loss (mg) | 3.03 | 0.90 | 0.50 | 0.50 |
| Average total mass loss (mg) | 49.50 | 37.63 | 40.10 | 37.93 |

Figure 15:
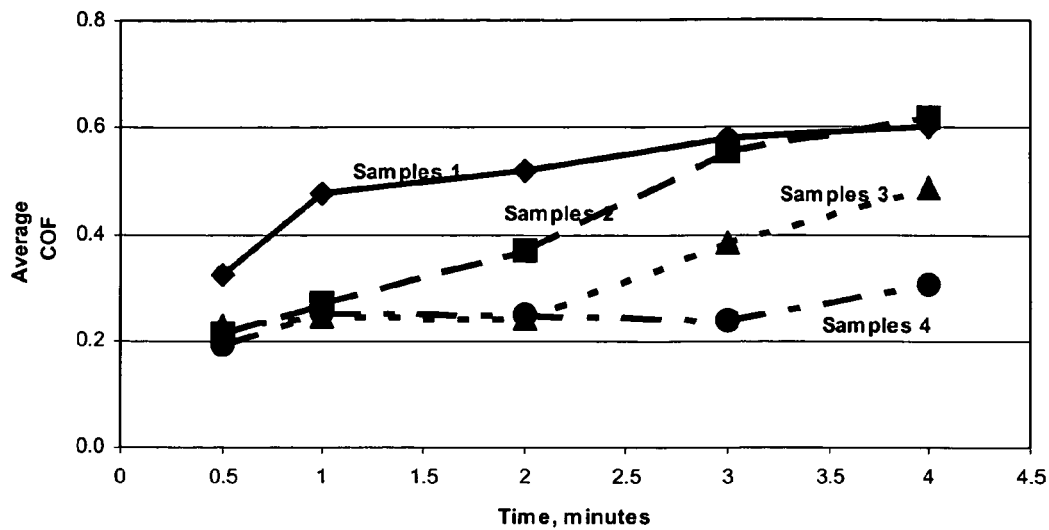
FIG. 15 is a graph showing data from determinations of average coefficients of friction comparing prior art lubricious coatings with a lubricious coating in accordance with an embodiment of the present invention.

The average coefficients of friction as a function of time are graphed in FIG. 15. As shown in FIG. 15, the Falex wear test coefficient of friction for electroless nickel samples with uniform lubricant concentration (samples 1, 2 and 3) obtain significantly more variation in the coefficients of friction and a greater increase in coefficient of friction with time than with the samples having a lubricant distribution in which the concentration of lubricant is highest in the innermost layer and lowest in the outermost layer, in accordance with the present invention. This is the case even though samples 3 had a lubricant layer having a higher total content of lubricant than did the samples 4 in accordance with the invention. From the data it is evident that less wear and more uniform coefficient of friction is obtained by using a multilayer coating with lubricant concentration less near the surface than near the base.

Example 5

At factory processing scale, on different dates, 200 kg each of two different geometry bolts, unplated M8×1.25×25 PC 8.8 captive washer bolts purchased from Brugola, part number W701605, and unplated M8×1.25×30 PC 9.8 flange head bolts purchased from SPS Technologies, part number N606543 are plated under standard factory conditions, subjected to baking for hydrogen embrittlement relief, 190° C. for four hours. The captive washer bolts are conversion coated in solution A to which 1 ml/l of Michelman ME 93235 emulsified lubricant has been added, and the flange head bolts are conversion coated using solution A containing 2.5 ml per liter of Michelman 93235 emulsified lubricant. The combination of passivant solution with emulsified lubricant produced a dual layer structure similar to figure two with a uniform conversion coating layer above which was a very concentrated thin layer of lubricant. After passivation, regardless of bolt geometry, bolts are immersed for thirty seconds in an integral lubricant solution that contains a mixture of solution B to which 12.5 ml per liter of Michelman ME 93235 and 0.5 g/l of DAY-GLO® D282 ultraviolet light excited dye has been added (the dye is to verify the chain of custody and to confirm the lubricant's presence). Bolts are then dried in a commercial spin drier until their average temperature is greater than 71° C., and packaged in the standard factory manner. The bolts are tested using the method of Ford WZ-100 with an RS Technologies torque tension test machine and Wilson Garner supplied bearing washers and S-309 test nuts as called for in the WZ-100 specification at an accredited independent laboratory, RS Technologies (Farmington Hills, Mich.). APGE cyclic corrosion testing per FLTM B1 123-01 and neutral salt spray test per ASTM B117 are performed on as received bolts and bolts that are baked for four hours at 120° C., at an accredited independent laboratory, National Exposure Testing, in Sylvania, Ohio. In each test, the sample size is 30 parts. The results are shown in the following table:

|  | Factory 1 Captive Washer Bolts | Factory 1 Flange Bolts | Factory 2 Captive Washer Bolts | Factory 2 Flange Bolts |
|---|---|---|---|---|
| Average Torque | 24.6 Nm @15.9 kN | 26.5 Nm @17.8 kN | 24.9 Nm @15.9 kN | 25.8 Nm @17.8 kN |
| Torque Standard Deviation | 1.2 Nm | 0.9 Nm | 1.5 Nm | 1.0 Nm |
| Number Passing WZ100 | 30 | 30 | 30 | 30 |
| APGE cycles without red rust | Exceeded 10 cycles for all bolts | Exceeded 10 cycles for all bolts | Exceeded 10 cycles for all bolts | Exceeded 10 cycles for all bolts |
| APGE cycles without red rust after baked | Exceeded 10 cycles for all bolts | Exceeded 10 cycles for all bolts | Exceeded 10 cycles for all bolts | Exceeded 10 cycles for 29 bolts. One bolt had <1% red at 10 cycles. |
| NSS, 96/240/384 hours | No red rust | No red rust | No red rust | No red rust |
| NSS baked 96/220/364 hours | No red rust | No red rust | No red rust | No red rust |
| NSS 96 hours white corrosion | No white corrosion | No white corrosion | No white corrosion | No white corrosion |
| NSS 96 hours baked white corrosion | No white corrosion | No white corrosion | No white corrosion | No white corrosion |

The acceptable range for passing this specification is a torque value between 20 and 30 Nm at a clamping force of 15.9 kN for the captive washer bolts and a torque value of 22.5 to 33.5 Nm at a clamping force of 17.8 kN for the flange bolts. All values are required by the standard to fall within ±3 standard deviations of the mean, which is sometimes referred to as the 6σ ("6 sigma") criterion or requirement. The specified torque values and clamping force equate to coefficient of friction values of ~0.133 for the washer bolt and ~0.13 for the flange bolt.

Example 6

In a further example of a process in accordance with an embodiment of the present invention, a fastener is:

1. Plated with zinc or zinc alloy, then rinsed.

2. Immersed in a trivalent passivant which contains an emulsified lubricant. This produces a dual layer coating with a corrosion resistant conversion coating layer having a thickness unaffected by the presence of the emulsified lubricant. As a result of this step, the conversion coating layer is 'topped' with a thin layer of lubricant. The emulsifiable lubricant is a high density polyethylene (HDPE) emulsion where the HDPE particle size is typically less than 50 nanometers, manufactured by Michelman (http://www.performanceadditives.com/products/me93235.htm). Another suitable source for such emulsifiable lubricants is Surface Technologies (http://www.surfacetechnology.com/specs-500.htm).

3. Immersed in a 'final seal' which is a mixture of an organic sealant and lubricant. Examples of final seals:

|  | Percent by Volume in Final Seal Composition | | | | | |
|---|---|---|---|---|---|---|
| NEOREZ ® R 961 | 14.7 | | | | | |
| NEOCRYL ® A 6092 | | | | | | 15 |
| HALOFLEX ® 2O2 | | | | | 20 | |
| PQ N Sodium Silicate | | | 7 | 7 | 9 | |
| PQ K Sil Potassium Silicate | | | | 5.9-11.8 | | |
| PQ Lithium Silicate | | 7.9-15.8 | | | | |
| LUDOX ® HS40 | 9.2 | | | | 2 | |
| FUCHS LUBRITECH ® Gleitmo 605 | | | 3 | | | 3 |
| Michelman ME 93235 | 1.2 | 1.3 | 1.3 | 1.3 | 1.3 | 1.3 |
| DAY-GLO ® D282 | 0.26 | | | | | 0.26 |
| DAXAD ® 15 | | 0.08-.16 | | | | |

DAY-GLO ® is added as an indicator. DAXAD ® 15 is a dispersant.

DAY-GLOA® is added as an indicator. DAXAD® 15 is a dispersant.

Example 7

In a further example the following concentrated trivalent chromium solutions are prepared:

| Concentrate I: | | Concentrate II: | | Concentrate III: | |
|---|---|---|---|---|---|
| H₂0, DE-IONIZED | 55.79% | H₂0, DE-IONIZED | 48.60% | H₂0, DE-IONIZED | 41.42% |
| Int Chrome Chloride | 18.37% | Int Chrome Chloride | 27.56% | Int Chrome Chloride | 36.74% |
| HNH₄F | 3.86% | HNH₄F | 3.39% | HNH₄F | 2.92% |
| NaNO₃ | 10.03% | NaNO₃ | 13.95% | NaNO₃ | 17.87% |
| ZnCl₂ | 0.53% | ZnCl₂ | 0.79% | ZnCl2 | 1.05% |
| Basic Chrome Sulfate | 4.35% | Basic Chrome Sulfate | 2.18% | | |
| CoSO₄•7H₂O | 1.10% | CoSO₄•7H₂O | 0.55% | | |
| HNO₃ | 5.99% | HNO3 | 3.00% | | |

(Intermediate chrome chloride (13% Cr(III)) and basic chrome sulfate (12% Cr(III)) were purchased from McGean Chemical Co.)

Diluted solutions of the preceding concentrates to which varying amounts, 0 ml/l, 5 ml/l, and 15 ml/l of Michelman ME 93235 are added are prepared and the pH's adjusted to 2.3 using nitric acid. Groups 1-7 of the diluted solutions are prepared as follows, in which in each group, A=0 ml/l ME 93253, B=5 ml/l ME 93253, C=15 ml/l ME 93253:

| Group | Makeup | A | B | C |
|---|---|---|---|---|
| 1 | 4% Concentrate I | 0 | 5 | 15 |
| 2 | 8% Concentrate I | 0 | 5 | 15 |
| 3 | 4% Concentrate II | 0 | 5 | 15 |
| 4 | 4% Concentrate III | 0 | 5 | 15 |
| 5 | 8% Concentrate III | 0 | 5 | 15 |
| 6 | 12% Concentrate III | 0 | 5 | 15 |
| 7 | 16% Concentrate III | 0 | 5 | 15 |

Zinc plated panels, ~10 microns in thickness, and zinc plated bolts ~8 microns in thickness are prepared by rack plating and barrel plating respectively and, following the plating and rinsing, are immersed for 60 seconds into the solutions described above, at room temperature. Bolts are then split into groups. One group is 'aged' for 24 hours at room temperature and another group is aged for 24 hours of at room temperature after baking for 250° C. for two hours. Bolts are further divided and tested for torque tension properties using the Ford WZ 101 test method, and NSS ASTM B117 corrosion resistance.

Figure 16:
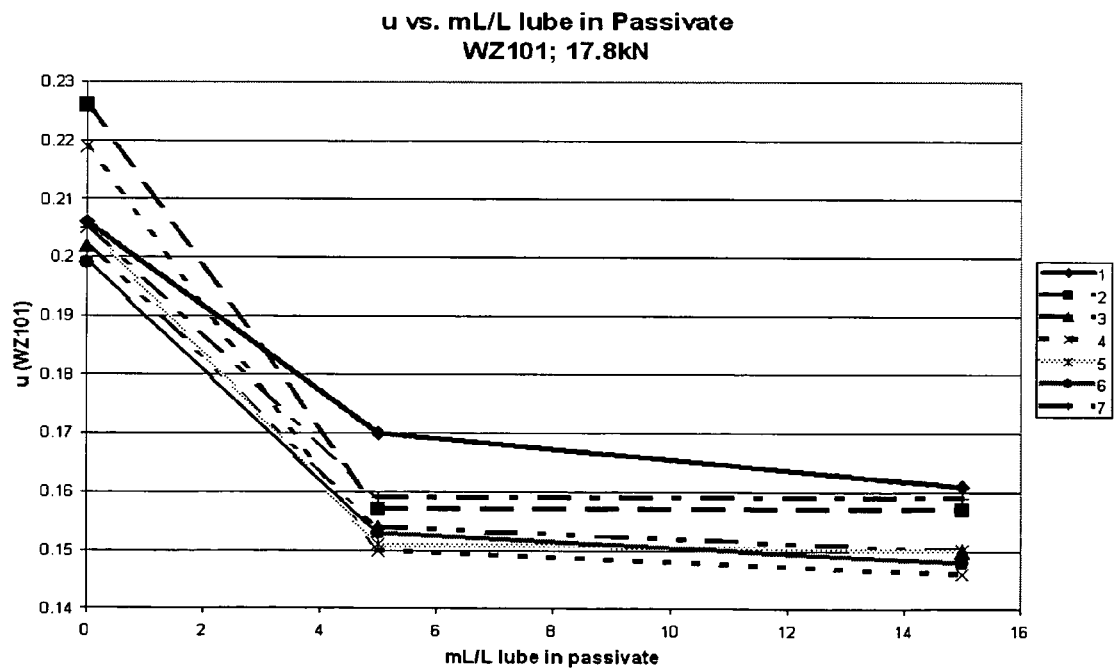
FIG. 16 is a graph of the torque tension test results versus concentration of the lubricant in a composition for forming the coated substrate of an embodiment of the present invention.

FIG. 16 is a graph of the torque tension test results versus concentration of the Michelman ME 93235 in the composition for the examples in Groups 1-7 above in this Example 7. As shown in FIG. 16, the torque tension test results show that coefficient of friction decreases from 0 to 5 ml/l of added Michelman ME 93235, and obtains only a small decrease from 5 to 15 ml/l of Michelman ME 93235. The data in this graph and the data shown below both demonstrate that a lubricious coating layer is formed from the conversion coating composition (which includes the emulsified lubricant) as a functional lubricating coating, it shows that the lubricating coating actually improves the lubrication of the surface, it shows that increasing the amount of lubricant in this layer only marginally improves lubrication after the initial amount (5 ml/l of lubricant) is added to the conversion coating composition, and it shows that it does not harm the neutral salt spray test results.

The following tables show test results on the ASTM B117 NSS test for the bolts in Groups 1-7. These data indicate that the presence or absence of Michelman ME 93235 had little effect on corrosion performance although the relative amounts of chromium in the passivating solution and whether or not the bolts were baked does affect corrosion protection.

| First Red Corrosion | | |
|---|---|---|
| | Not Baked | Baked |
| 1A | 475.2 | 417.6 |
| 1B | 499.2 | 451.2 |
| 1C | 451.2 | 268.8 |
| 2A | 408 | 182.4 |
| 2B | 340.8 | 230.4 |
| 2C | 345.6 | 168 |
| 3A | 504 | 489.6 |
| 3B | 504 | 504 |
| 3C | 475.2 | 504 |
| 4A | 451.2 | 345.6 |

-continued

| First Red Corrosion | | |
|---|---|---|
| | Not Baked | Baked |
| 4B | 355.2 | 326.4 |
| 4C | 460.8 | 484.8 |
| 5A | 504 | 398.4 |
| 5B | 504 | 504 |
| 5C | 504 | 504 |
| 6A | 504 | 499.2 |
| 6B | 504 | 504 |
| 6C | 504 | 504 |
| 7A | 504 | 484.8 |
| 7B | 504 | 504 |
| 7C | 504 | 504 |

The plated and conversion coated panels in Groups 1-7 are aged for 24 hours at room temperature then subjected to ASTM B 117 neutral salt spray (NSS). The following table contains the results of the NSS testing:

| Panel ID | Hours to 5% White | Hours to First Red |
|---|---|---|
| 1A | 960 | 1152 |
| 1B | 1152 | 984 |
| 1C | 720 | 960 |
| 2A | 672 | >1176 |
| 2B | 840 | >1176 |
| 2C | 720 | 1008 |
| 3A | 960 | >1176 |
| 3B | 960 | 960 |
| 3C | 984 | >1176 |
| 4A | 720 | >1176 |
| 4B | 792 | >1176 |
| 4C | 840 | >1176 |
| 5A | 1152 | >1176 |
| 5B | 1152 | >1176 |
| 5C | 960 | >1176 |
| 6A | 840 | >1176 |
| 6B | 984 | >1176 |
| 6C | 1176 | >1176 |
| 7A | 792 | 1056 |
| 7B | 1152 | >1176 |
| 7C | 1152 | >1176 |

Thus, as shown by the foregoing, as can be seen by comparison of the data for the panels and the data from the bolts there appears to be no harm to corrosion resistance when using the Michelman ME 93235 in the conversion coating compositions used to form a first lubricious coating layer on a conversion coating in accordance with the present invention.

In yet another embodiment of the invention conversion coating solutions that blacken zinc or zinc alloys, commonly referred to as black passivates, may be combined with an emulsified lubricant then subsequently sealed using a integral seal having a coefficient of friction greater than the coefficient of friction of the two layer coating obtained by the combination of black passivate and emulsified lubricant, to obtain the relationship of layers, coefficient of friction and lubricant content in accordance with the present invention.

Historically zinc and zinc alloys are blackened using solutions containing arsenic or mixtures of copper chloride and copper nitrate (The Chemical Formulary, volume 6, Chemical Publishing Co., 1943, pp 223), ferric chloride (attributed to Albrecht Durer), trivalent chromium containing phosphoric acid (Bishop U.S. Pat. No. 5,393,353), selenium, tellurium, and mercapto compounds ("The chemical coloring of metals", Samuel Field, D. Van Nostrand, 1926), or the inclusion of dyes and pigments (Clarient). In general such blackening agents may be combined with a solution of trivalent chromium salts to produce coatings that are not only black but have some corrosion protection.

Examples of black lubricious coatings for zinc and zinc alloy are as follows:

| Surface | Zinc or Zinc Alloy | Zinc or Zinc Alloy | Zinc Nickel alloy Ni>9% |
|---|---|---|---|
| Ammonium bifluoride | 0.57% w/w | 0.57% w/w | 0.57% w/w |
| Sodium nitrate | 0.26% w/w | 0.26% w/w | 0.26% w/w |
| Chrometan B (Elementis) | 1.04% w/w | 1.04% w/w | 1.04% w/w |
| Cobalt sulfate heptahydrate | 0.25% w/w | 0.25% w/w | 0.25% w/w |
| Water | To 100% w/w | To 100% w/w | To 100% w/w |
| Phosphoric acid (85%) | 50 ml/l | | 80 ml/l |
| Ferrous chloride | 75 g/l | | |
| Thioglycolic acid (Aldrich) | | 8 ml/l | |
| pH | 1.5–2 | 1.5–2.5 | 1.2–2.0 |
| Michelman ME 93235 | 2 ml/l | 2 ml/l | 2 ml/l |

Following dipping for 60 seconds in the above solutions the resultant black zinc or zinc alloy surfaces are dipped into a seal containing lubricant. The seal may be a clear seal such as previous examples or a black lubricant containing seal such as a 20% v/v solution of Acheson EMRALON® TM-008 from National Starch Co., or a black seal to which lubricant has been added such as a 50% v/v solution of Atotech CORROSIL® 601 to which 2 ml/l of FUCHS LUBRITECH® Gleitmo 605 has been added.

It is noted that in the foregoing examples, extensive use of FUCHS LUBRITECH® Gleitmo 605 and Michelman ME 235 have been used. These are merely examples and the present invention is not limited to use of such lubricants. For example, other emulsifiable lubricants, including, e.g., other emulsified polyethylenes are available from Michelman and from other sources, such as Alko America, Sunoco, Shell Industrial and Renite. Other lubricants are disclosed above.

Those skilled in the coating arts will understand, based on the foregoing disclosure, that other methods of creating surface coatings whose outermost lubricity is reduced relative to the lubricity of the inner portions (or, conversely, where the outermost coefficient of friction is greater than the innermost portions) of the surface coating may be used. For example, one could use vacuum deposition methods to co-deposit a lubricating material, such as graphitic carbon, with a coating matrix of titanium nitride, and obtain the benefits of the present invention by gradually reducing the quantity of graphitic carbon provided to the vacuum deposition. Similarly, organic coating layers could be sprayed on in which the initial layer(s) contain a greater concentration of a lubricant and subsequent layer(s) contain a reduced concentration of the lubricant. Electrodeposits with varying amounts of zinc within an iron matrix, for example, could also produce an inverted lubrication coating with zinc-rich regions being closest to the substrate. Immersing a conversion coated zinc coating in a concentrated lubricant and them immersing the object in a seal containing less lubricant is substantially similar to what has been disclosed herein.

It is noted that, throughout the specification and claims, the numerical limits of the disclosed ranges and ratios may be combined, and are deemed to include all intervening values. Furthermore, all numerical values are deemed to be preceded by the modifier "about", whether or not this term is specifically stated.

While the principles of the invention have been explained in relation to certain particular embodiments, and are provided for purposes of illustration, it is to be understood that various modifications thereof will become apparent to those skilled in the art upon reading the specification. Therefore, it is to be understood that the invention disclosed herein is intended to cover such modifications as fall within the scope of the appended claims. The scope of the invention is limited only by the scope of the claims.

The invention claimed is:

1. A coated metal fastener, comprising:
   a first lubricious coating layer overlying the metal fastener, the first lubricious coating layer comprising a first lubricant providing to the first lubricious coating layer a first coefficient of friction; and
   a second lubricious coating layer overlying the first lubricious coating layer, the second lubricious coating layer comprising a second lubricant providing to the second lubricious coating layer a second coefficient of friction, wherein the second coefficient of friction is greater than the first coefficient of friction,
   wherein at least one of the first lubricious coating layer and the second lubricious coating layer further comprises a binder or a curable resin or comprises or is in the form of a dry film lubricant and the first lubricant has a first lubricity the second lubricant has a second lubricity and the first lubricity is lower than the second lubricity.

2. The coated metal fastener of claim 1 wherein the first and second lubricants are the same lubricant, and the lubricant is present in the first lubricious coating layer at a concentration greater than a concentration of the lubricant in the second lubricious coating layer.

3. The coated metal fastener of claim 1 wherein the first and second lubricants are different lubricants.

4. The coated metal fastener of claim 1 further comprising a third lubricious coating layer overlying the second lubricious coating layer, the third lubricious coating layer comprising a third lubricant providing to the third lubricious coating layer a third coefficient of friction, wherein the third coefficient of friction is greater than to the second coefficient of friction.

5. The coated metal fastener of claim 1 further comprising at least two additional coating layers overlying the second lubricious coating layer, wherein each subsequent coating layer includes a lubricant which provides to the respective subsequent coating layer a coefficient of friction greater than that of each preceding coating layer.

6. The coated metal fastener of claim 1 wherein the metal fastener is coated with a base layer comprising one or more of, a metal or an alloy layer, a conversion coating, and a sealing composition, wherein the first lubricious coating layer overlies the base layer.

7. The coated metal fastener of claim 1 wherein at least one of the first lubricious coating layer and the second lubricious coating layer further comprises a sealing composition, a colorant, a phosphorescent composition, a fluorescent composition, or a mixture or combination of any two or more thereof.

8. The coated metal fastener of claim 1 wherein at least one of the first lubricant and the second lubricant comprises a natural or synthetic of petroleum-based wax, a vegetable fat or oil, a fluorinated polymer, a polyolefin polymer, molybdenum sulfide, tungsten disulfide, silver, graphite, soapstone, a stearate, a dithiophosphonate, a calcium based grease, a reactive white solid lubricant, or a mixture or combination of any two or more thereof.

9. The coated metal fastener of claim 1 wherein at least one of the first lubricious coating layer and the second lubricious coating layer is or comprises the dry film lubricant.

10. The coated metal fastener of claim 1 wherein the metal fastener has a surface and (A) one or more layer of a metal or alloy is on the surface and the first lubricious coating layer is on the one or more layer of a metal or alloy, (B) a layer of a conversion coating is on the surface and the first lubricious coating layer is on the layer of a conversion coating, or (C) one or more layer of a metal or alloy is on the surface, a layer of a conversion coating is on the one or more layer of a metal or alloy and the first lubricious coating layer is on the layer of a conversion coating.

11. A coated metal fastener, comprising:
a first lubricious coating layer overlying the metal fastener, the first lubricious coating layer comprising a first lubricant providing to the first lubricious coating layer a first coefficient of friction; and
a second lubricious coating layer overlying the first lubricious coating layer, the second lubricious coating layer comprising a second lubricant providing to the second lubricious coating layer a second coefficient of friction, wherein the second coefficient of friction is greater than the first coefficient of friction,
wherein at least one of the first lubricious coating layer and the second lubricious coating layer further comprises a binder or a curable resin or comprises or is in the form of a dry film lubricant, wherein at least one of the first lubricious coating layer and the second lubricious coating layer further comprises the binder and the binder comprises one or more of an epoxy, an acrylic, a silicone, a phenolic resin, an inorganic silicate, waterglass and cellulose.

12. A coated metal fastener, comprising:
a first lubricious coating layer overlying the metal fastener, the first lubricious coating layer comprising a first lubricant providing to the first lubricious coating layer a first coefficient of friction; and
a second lubricious coating layer overlying the first lubricious coating layer, the second lubricious coating layer comprising a second lubricant providing to the second lubricious coating layer a second coefficient of friction, wherein the second coefficient of friction is greater than the first coefficient of friction,
wherein at least one of the first lubricious coating layer and the second lubricious coating layer further comprises a binder or a curable resin or comprises or is in the form of a dry film lubricant, wherein at least one of the first lubricious coating layer and the second lubricious coating layer further comprises the curable resin.

13. The coated metal fastener of claim 12 wherein the curable resin comprises one or more of phenolic resins, polyurethanes, thermoplastics, polyamide resins, polyimide resins, alkyd resins, acrylic resins, epoxy resins and thermosetting resins.

14. A plurality of coated metal fasteners, comprising:
a first lubricious coating layer overlying the substrate, the first lubricious coating layer comprising a first lubricant providing to the first lubricious coating layer a first coefficient of friction; and
a second lubricious coating layer overlying the first lubricious coating layer, the second lubricious coating layer comprising a second lubricant providing to the second lubricious coating layer a second coefficient of friction,
wherein the second coefficient of friction is greater than the first coefficient of friction,
wherein when the coated metal fasteners include fasteners having at least two different geometries selected from the group consisting of captive washer bolts, flange head bolts and hexagonal head bolts, the fasteners having at least two different geometries have torque values, at a specified load, within a specified torque range and have an average torque value that is ±3 standard deviations within the specified torque range and the first lubricant has a first lubricity the second lubricant has a second lubricity and the first lubricity is lower than the second lubricity.

15. The coated metal fasteners of claim 14 wherein the first and second lubricants are the same lubricant, and the lubricant is present in the first lubricious coating layer at a concentration greater than a concentration of the lubricant in the second lubricious coating layer.

16. The coated metal fasteners of claim 14 wherein the first and second lubricants are different lubricants.

17. The coated metal fasteners of claim 14 further comprising a third lubricious coating layer overlying the second lubricious coating layer, the third lubricious coating layer comprising a third lubricant providing to the third lubricious coating layer a third coefficient of friction, wherein the third coefficient of friction is greater than to the second coefficient of friction.

18. The coated metal fasteners of claim 14 further comprising at least two additional coating layers overlying the second lubricious coating layer, wherein each subsequent coating layer includes a lubricant which provides to the respective subsequent coating layer a coefficient of friction greater than that of each preceding coating layer.

19. The coated metal fasteners of claim 14 wherein the fasteners are coated with a base layer comprising one or more of, a metal or an alloy layer, a conversion coating, and a sealing composition, wherein the first lubricious coating layer overlies the base layer.

20. The coated metal fasteners of claim 14 wherein at least one of the first lubricious coating layer and the second lubricious coating layer further comprises a sealing composition, a colorant, a phosphorescent composition, a fluorescent composition, or a mixture or combination of any two or more thereof.

21. The coated metal fasteners of claim 14 wherein the lubricant comprises a natural or synthetic of petroleum-based wax, a vegetable fat or oil, a fluorinated polymer, a polyolefin polymer, molybdenum sulfide, tungsten disulfide, silver, graphite, soapstone, a stearate, a dithiophosphonate, a calcium based grease, a reactive white solid lubricant, or a mixture or combination of any two or more thereof.

22. The coated metal fasteners of claim 14 wherein at least one of the first lubricious coating layer and the second lubricious coating layer comprises a dry film lubricant.

23. The coated metal fasteners of claim 14 wherein at least one of the first lubricious coating layer and the second lubricious coating layer further comprises a binder or a curable resin or comprises or is in the form of a dry film lubricant.

24. A plurality of coated metal fasteners, comprising:
a first lubricious coating layer overlying the substrate, the first lubricious coating layer comprising a first lubricant providing to the first lubricious coating layer a first coefficient of friction; and
a second lubricious coating layer overlying the first lubricious coating layer, the second lubricious coating layer comprising a second lubricant providing to the second lubricious coating layer a second coefficient of friction, wherein the second coefficient of friction is greater than the first coefficient of friction, wherein when the coated metal fasteners include fasteners having at least two different geometries selected from the group consisting of captive washer bolts, flange head bolts and hexagonal head bolts, the fasteners having at least two different geometries have torque values, at a specified load, within a specified torque range and have an average torque value that is ±3 standard deviations within the specified torque range, wherein at least one of the first lubricious coating layer and the second lubricious coating layer further comprises a binder and the binder comprises one or more of an epoxy, an acrylic, a silicone, a phenolic resin, an inorganic silicate, waterglass and cellulose.

25. A plurality of coated metal fasteners, comprising:

a first lubricious coating layer overlying the substrate, the first lubricious coating layer comprising a first lubricant providing to the first lubricious coating layer a first coefficient of friction; and a second lubricious coating layer overlying the first lubricious coating layer, the second lubricious coating layer comprising a second lubricant providing to the second lubricious coating layer a second coefficient of friction, wherein the second coefficient of friction is greater than the first coefficient of friction, wherein when the coated metal fasteners include fasteners having at least two different geometries selected from the group consisting of captive washer bolts, flange head bolts and hexagonal head bolts, the fasteners having at least two different geometries have torque values, at a specified load, within a specified torque range and have an average torque value that is ±3 standard deviations within the specified torque range, wherein at least one of the first lubricious coating layer and the second lubricious coating layer further comprises a curable resin.

26. The coated metal fasteners of claim 25 wherein the curable resin comprises one or more of phenolic resins, polyurethanes, thermoplastics, polyamide resins, polyimide resins, alkyd resins, acrylic resins, epoxy resins and thermosetting resins.

* * * * *